United States Patent
Randad et al.

(10) Patent No.: US 11,949,561 B2
(45) Date of Patent: Apr. 2, 2024

(54) AUTOMATED PREVENTATIVE CONTROLS IN DIGITAL WORKFLOW

(71) Applicant: ServiceNow, Inc., Santa Clara, CA (US)

(72) Inventors: Anushree Shrivallabh Randad, Santa Clara, CA (US); Ravindra Bansal, Belmont, CA (US); Tamir Segal, Sunnyvale, CA (US); Abhi Sekhar Thyadi, Hyderabad (IN); Hari Krishna Vutukuru, Hyderabad (IN); Samujjwal Bhandari, San Jose, CA (US); Utkarsh Jain, Hyderabad (IN); Vasant Balasubramanian, Santa Clara, CA (US); Lal Narayanasamy, Pleasanton, CA (US); Giora Tamir, San Diego, CA (US); Rama Raghava Reddy Bandi, Livermore, CA (US); Prabhat Kuchibhotla, East Palo Alto, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/867,963

(22) Filed: Jul. 19, 2022

(65) Prior Publication Data
US 2024/0031232 A1   Jan. 25, 2024

(51) Int. Cl.
*H04L 41/0894* (2022.01)
*H04L 41/0823* (2022.01)
*H04L 41/22* (2022.01)

(52) U.S. Cl.
CPC ...... *H04L 41/0894* (2022.05); *H04L 41/0823* (2013.01); *H04L 41/22* (2013.01)

(58) Field of Classification Search
CPC .. H04L 41/0894; H04L 41/0823; H04L 41/22
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |

(Continued)

*Primary Examiner* — John M Macilwinen
(74) *Attorney, Agent, or Firm* — Fletcher Yoder, PC

(57) ABSTRACT

A system includes a processor and memory storing instructions that cause the processor to receive, from a client device, inputs defining associations between one or more control objectives and one more policies, wherein the one or more control objectives define one or more functions to be performed to comply with the one or more policies. The processor may map the one or more policies associated with the one or more control objectives to an application environment and receive, from the client device or a different client device, a change set to an application in the application environment, wherein the change set comprises one or more modifications to the application. The processor may then determine whether the change set adheres to the one or more policies and restrict implementation of the change set in response to determining that the change set does not adhere to the one more policies.

20 Claims, 29 Drawing Sheets

(56) References Cited

U.S. PATENT DOCUMENTS

| | | |
|---|---|---|
| 7,170,864 B2 | 1/2007 | Matharu |
| 7,350,209 B2 | 3/2008 | SHum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,590,052 B2 * | 11/2013 | Kruger ............... G06F 21/62 726/28 |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,098,322 B2 | 8/2015 | Apte |
| 9,239,857 B2 | 1/2016 | Trinon |
| 9,317,327 B2 | 4/2016 | Apte |
| 9,363,252 B2 | 6/2016 | Meuller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 11,361,268 B1 * | 6/2022 | Fisher ............... G06Q 10/0637 |
| 11,366,656 B2 * | 6/2022 | Garay ............... G06F 8/71 |
| 2004/0193703 A1 * | 9/2004 | Loewy ............... H04L 41/0893 709/220 |
| 2004/0243699 A1 * | 12/2004 | Koclanes ............... H04L 41/5003 709/224 |
| 2010/0325607 A1 * | 12/2010 | Meijer ............... G06F 8/447 717/137 |
| 2013/0340035 A1 * | 12/2013 | Uziel ............... G06F 21/00 726/1 |
| 2015/0142700 A1 * | 5/2015 | Best ............... G06N 5/04 706/11 |
| 2019/0104156 A1 * | 4/2019 | Barkovic ............... H04L 67/60 |
| 2020/0097390 A1 * | 3/2020 | Gunter ............... G06F 11/3684 |
| 2020/0192780 A1 * | 6/2020 | Schroeder ............... G06F 11/3624 |
| 2023/0035197 A1 * | 2/2023 | Schepis ............... H04L 41/12 |
| 2023/0155984 A1 * | 5/2023 | Adam ............... H04L 63/0281 726/26 |

* cited by examiner

INFORMATION SECURITY AND DATA PROTECTION POLICY
POLO020002

NUMBER    TYPE    VALID TO
POLO020002    POLICY    2024-12-14

| OVERVIEW | DETAILS | POLICY TEXT | CONTROL OBJECTIVES | POLICIES | POLICY EXCEPTIONS |

CONTROL OBJECTIVES [ADD]

| ☐ CONTROL OBJECTIVE | SOURCE ID | CATEGORY | CLASSIFICATION | TYPE | COMPLIANCE SCORE |
|---|---|---|---|---|---|
| DENY ACCESS TO URLS WITH UNAUTHORIZED HOSTS | (EMPTY) | PRIVACY PROTECTION FOR INFORMATION AND DATA | PREVENTATIVE | DATA & INFO MANAGEMENT | 0 |
| ALL SENSITIVE INFO SHOULD BE ENCRYPTED | (EMPTY) | PRIVACY PROTECTION FOR INFORMATION AND DATA | PREVENTATIVE | DATA & INFO MANAGEMENT | 0 |
| USE ONLY ALLOWED KEYWORDS FOR PASSWORDS | (EMPTY) | PRIVACY PROTECTION FOR INFORMATION AND DATA | PREVENTATIVE | DATA & INFO MANAGEMENT | 0 |
| INFORMATION CANNOT BE SHARED WITH BLACKLISTED DOMAINS | (EMPTY) | PRIVACY PROTECTION FOR INFORMATION AND DATA | PREVENTATIVE | DATA & INFO MANAGEMENT | 0 |
| USE SECURE NETWORK FILE TRANSFER PROTOCOLS | (EMPTY) | PRIVACY PROTECTION FOR INFORMATION AND DATA | PREVENTATIVE | DATA & INFO MANAGEMENT | 0 |

REQUEST POLICY EXCEPTION

SPECIFY THE REASON YOU ARE REQUESTING THIS EXCEPTION, A BUSINESS JUSTIFICATION, AND THE START AND END DATES. YOU CAN VIEW THE STATUS OF THIS REQUEST ON THE EXCEPTIONS TAB

DEPLOYABLE — 448
DEVELOPMENT_1

POLICY *
AUTHORISEDEMAILDOMAINS — 373

REASON FOR EXCEPTION * — 596
OTHER ▼

BUSINESS JUSTIFICATION * — 598
MY BUSINESS JUSTIFICATION

REQUESTED START DATE * — 600
2022-04-13 11:33:09

REQUESTED END DATE * — 602
2022-05-13 11:33:09

CANCEL   REQUEST — 604

EXCEPTION FOR POLICY: AUTHORISEDEMAILDOMAINS FOR
PER0002020
NUMBER      STATE    REGISTER   PRIORITY   VALID FROM              VALID TO
PER0002020  ANALYZE  CDM ADMIN  4-LOW      2022-04-14 11:33...     2022-05-01 11:33...

OVERVIEW  DETAILS  VERIFICATION  APPROVALS  IMPACTED CONTROLS (1)  APPROVALS  TASK SLAs  CONTENT REFERENCES

ASSIGNMENT

[COMPLIANCE MANAGERS    ○]
  APPROVER *
  [                        ]

RISK ASSESSMENT — 630
RISK RATING * — 632
  -- NONE --
  -- NONE --
  1-LOW
  2-MEDIUM           } — 634
  3-HIGH
  4-CRITICAL

RISK MITIGATION PLAN

COMMENTS
                    636

COMPOSE
  ✎ WORK NOTES (PRIVATE) ⇌ COMMENTS
  [TYPE YOUR WORK NOTES (PRIVATE) HERE]
                              [POST WORK NOTES (PRIVATE)]

ACTIVITY                                ▽ ⇅ ⋯
  ✎  CDM ADMIN
     FIELD CHANGES • 2022-04-13 11:33:33
  IMPACT      3-LOW
  PRIORITY    4-LOW
  REQUESTER   CDM ADMIN
  STATE       ANALYZE

AUTOMATED PREVENTATIVE CONTROLS IN DIGITAL WORKFLOW

BACKGROUND

The present disclosure relates generally to techniques for detecting and resolving non-compliance of computing resources and software applications provided on a cloud-based platform.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g., computing devices, load balancers, firewalls, switches, etc.) and software resources (e.g., productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

In an enterprise or organization, certain applications and resources may be developed and deployed using a cloud-based platform. During development of these applications and resources, application developers may be tasked with writing computer source code for the applications and other individuals of the organization may be tasked with reviewing the written source code to ensure that the codified aspects of the application adhere to various regulatory and/or internal policies employed by the organization. However, due to the complexity of the changing regulatory landscape, as policies change, applications may no longer be compliant with the changing policies. Accordingly, it may be desirable to develop techniques for monitoring policy compliance and bringing applications and/or resources into compliance when the applications and/or resources are determined to be out of compliance with existing policies.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a processor and a memory storing instructions that, when executed, cause the processor to receive, from a client device, inputs defining associations between one or more control objectives and one or more policies, wherein the one or more control objectives define one or more functions to be performed to comply with the one or more policies. The processor may also map the one or more policies associated with the one or more control objectives to an application environment and receive, from the client device or a different client device, a change set to an application in the application environment, wherein the change set comprises one or more modifications to the application. The processor may then determine whether the change set adheres to the one or more policies and restrict implementation of the change set to the application in the application environment in response to determining that the change set does not adhere to the one more policies.

In another embodiment a method for testing compliance in an application environment comprises receiving, from a client device, a change set to an application in the application environment, wherein the change set comprises one more modifications to the application and accessing a database storing a plurality of associations between one or more control objectives and one or more policies, wherein the one or more control objectives define functions to be performed to comply with the one or more policies. The method may further comprise determining whether the change set complies with the one or more policies associated with the one or more control objectives stored in the database and restricting implementation of the change set in the application environment in response to determining that the change set does not comply with the one or more policies.

In another embodiment, a non-transitory, computer-readable medium comprises computer-executable instructions configured to, when executed, cause a processor to receive, from a client device, a request for an exception to one or more policies associated with one or more control objectives, wherein the one or more policies associated with the one or more control objectives are mapped to one or more application environments, and wherein the one or more control objectives define one or more functions to be performed to comply with the one or more policies. The instructions may further cause the processor to receive, from the client device, a change set to an application in an application environment of the one or more application environments, wherein the change set comprises one or more modifications to the application. The instructions may further cause the processor to determine whether the change set adheres to the one or more policies associated with the one or more control objectives and to determine whether the request for the exception is granted in response to determining that the change set does not adhere to the one or more policies. The processor may then enable implementation of the change set in response to determining that the request for the exception is granted.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 5 depicts an example of a screen for reviewing and managing one or more high level regulatory policies employed by an organization, in accordance with aspects of the present disclosure;

FIG. 8 depicts an example of a screen for reviewing and managing one or more policy as a code engine policies, in accordance with aspects of the present disclosure;

FIG. 10 depicts the policy as a code engine policy of FIG. 9 enabled for exceptions, in accordance with aspects of the present disclosure;

FIG. 15 depicts the screen of FIG. 5 with one or more controls displayed, in accordance with aspects of the present disclosure;

FIG. 21 depicts an example of a screen for reviewing and managing a change set, in accordance with aspects of the present disclosure;

FIG. 23 depicts an example of a screen for requesting an exception to a policy as a code engine policy, in accordance with aspects of the present disclosure;

FIG. 24 depicts the screen of FIG. 16 showing configuration results, in accordance with aspects of the present disclosure;

FIG. 25 depicts the screen of FIG. 16 showing requested exceptions, in accordance with aspects of the present disclosure;

FIG. 26A depicts a screen for evaluating a risk level associated with a requested exception, in accordance with aspects of the present disclosure;

FIG. 26B depicts a screen for evaluating a risk level associated with a requested exception, in accordance with aspects of the present disclosure;

FIG. 27 depicts the screen of FIG. 21 showing validation results for one or more policy as a code engine policies, in accordance with aspects of the present disclosure;

DETAILED DESCRIPTION

Figure 1:
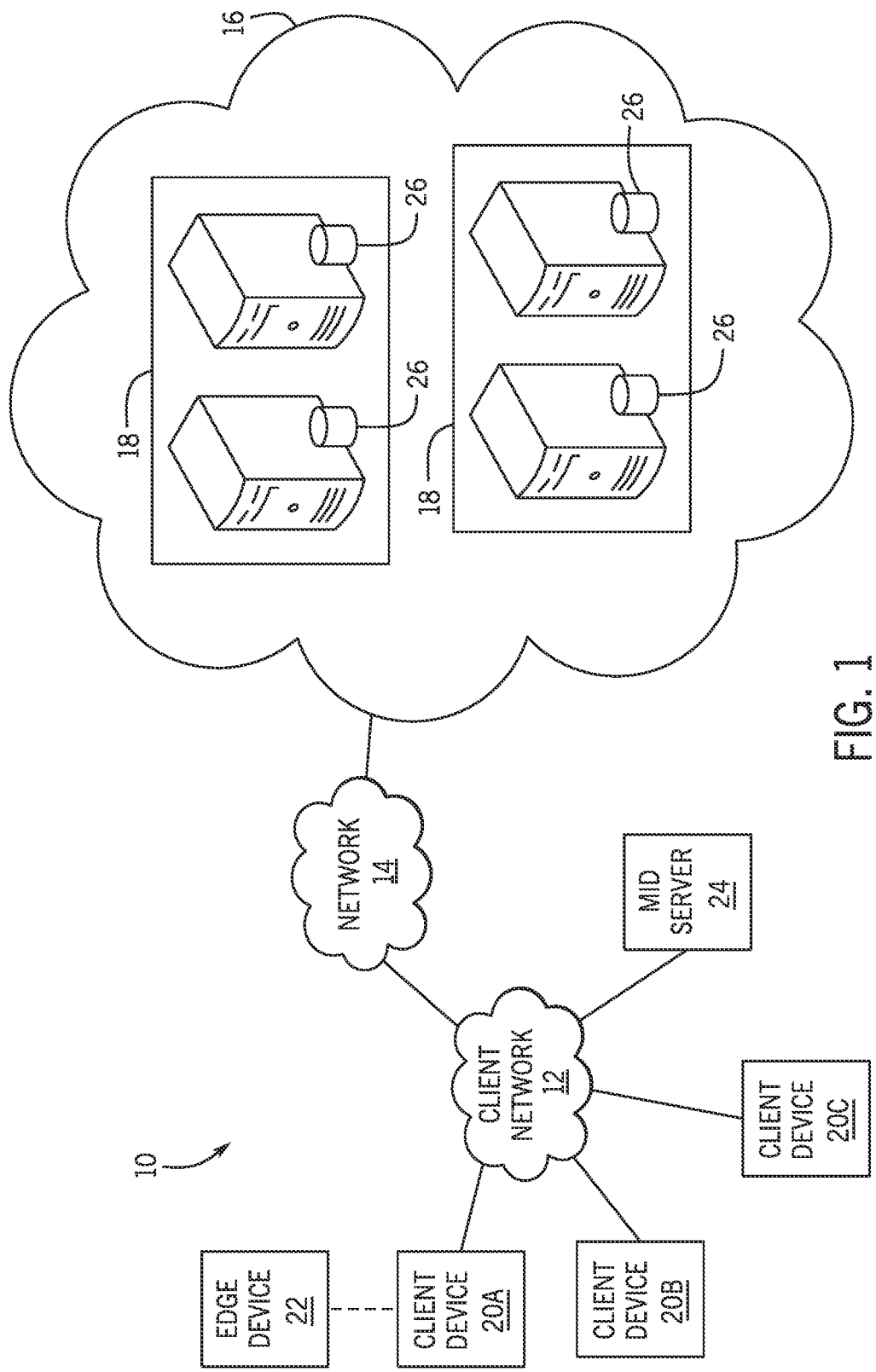
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored, such as in a CMDB.

Organizations rely on cloud computing platforms to provide a number of resources and services to customers and clients of the organization. Such cloud computing platforms may include various computing resources and/or software applications that enable customers of the organization to perform actions and/or activities on a cloud-based platform. Many of the services and/or software applications provided by the organizations are internally regulated by the organization and/or by various external agencies. For example, within the governance, risk, and compliance (GRC) industry segment, certain controls (e.g., functions to perform to comply with one or more policies) may be implemented to ensure that developed applications adhere to the policies (e.g., regulatory policies, information technology (IT) policies, organizational policies), best practices, and ethical standards employed by the organization. Traditionally, however, the GRC industry has operated under detective controls such that upon violation of a policy, remedial action may be taken to resolve the violation, and then the underlying code associated with the violation may be addressed after the violation has occurred.

Further, in traditional development and deployment processes for software applications on a cloud-based platform, developers may undergo training to become familiar with regulatory policies employed by the organization such that subsequently developed applications adhere to the policies outlined during the training. After completing training, developers may be tasked with writing the computer code for the application and providing evidence that the written code adheres to the policies and standards employed by the organization. A representative of the organization (e.g., compliance manager) may also be tasked with manually reviewing the underlying computer code for each application (and/or the evidence provided by the developer) to determine whether aspects of the code are compliant with regulatory policies employed by the organization. Similarly, auditors tasked with evaluating compliance of a particular application must manually review records of the computer code to identify non-compliant aspects of the code. Such processes may be tedious, time-consuming, and inefficient, and further may be susceptible to human error and/or violations due to an ever changing regulatory landscape.

It is now recognized that improved techniques for developing and deploying applications that adhere to regulatory policies and ethical standards employed by an organization are desired. Accordingly, the present techniques are directed towards leveraging the capabilities of a policy as a code engine (PaCE) to generate a plurality of codified policies (e.g., PaCE policies, codified policies) which may then be associated with control objectives to provide business and regulatory context to the codified policies. In turn, the codified policies may be mapped to certain application environments and executed against written source code to ensure that technology risks are mitigated during development and/or deployment of the application. That is, the present techniques disclosed herein utilize a policy as a code engine to associate various controls with regulatory policies employed by the organization such that codified policies with embedded controls may be generated and used during the development and deployment process. By using the policy as a code engine and associating control objectives with a regulatory policy as disclosed herein, codified policies with embedded preventative controls may be generated, thereby improving compliance in a changing regulatory landscape, increasing visibility for integrated risk management procedures, and facilitating a compliance review process that may be performed by a compliance manager of the organization and/or an auditor.

Accordingly, the present approach relates to techniques that may be used to develop and deploy software applications that adhere to regulatory policies employed by the organization. Indeed, the present techniques discussed herein provide an improvement over traditional software application development and deployment processes by codifying one or more policies utilizing a policy as a code engine that are then associated with embedded preventative controls such that as developers are developing new applications and/or modifying existing applications, the new and/or modified code may be automatically compared to the codified policies to determine whether the code adheres to each of the controls associated with the codified policies. Upon determining that the computer code for the application violates one or more of the embedded preventative controls associated with a particular policy, the developer tasked with creating or modifying the application may be provided with information associated with which aspects of the code are non-compliant with the regulatory policies employed by the organization, thereby enabling the developer to address the non-compliant aspects of the code before deploying the code in an application that may be used by customers of the organization. That is, integrated risk management (IRM) reports may be automatically generated that provide improved visibility into whether a particular application adheres to the regulatory policies employed by the organization, thereby facilitating a review process by a compliance manager and/or an audit by an auditor. Additionally, functionality is provided for requesting exceptions to certain non-compliant aspects of written code, thereby enabling a developer to continue developing a particular application despite having portions of code that are non-compliant with the regulatory policies employed by the organization. By providing embedded preventative controls, application compliance may be evaluated as the applications are developed and prior to deployment, thereby limiting a number of compliance issues after the application has been deployed. In this way, an efficiency of the development and deployment process may be improved.

With the preceding in mind, the following figures and corresponding description relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
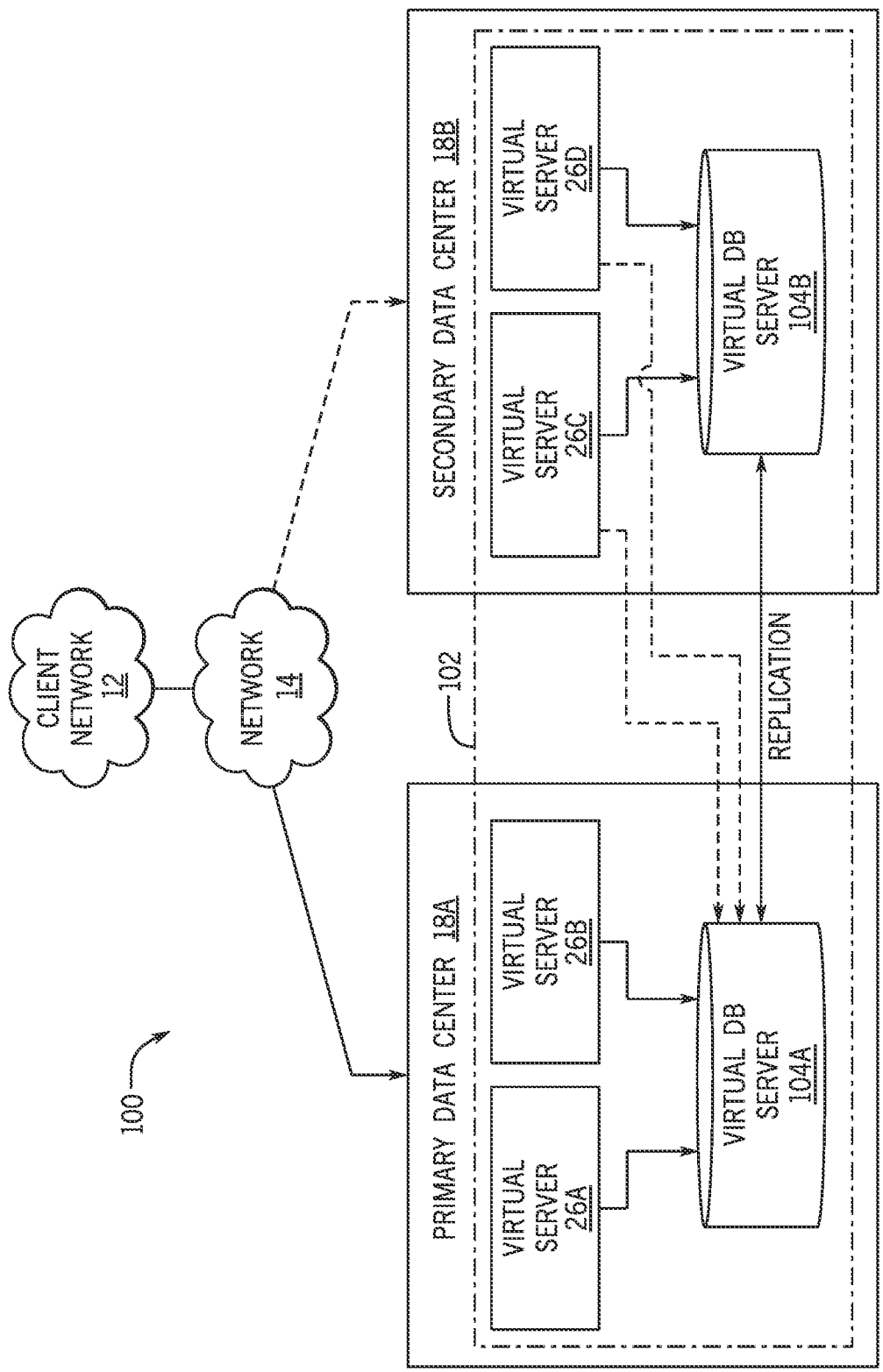
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
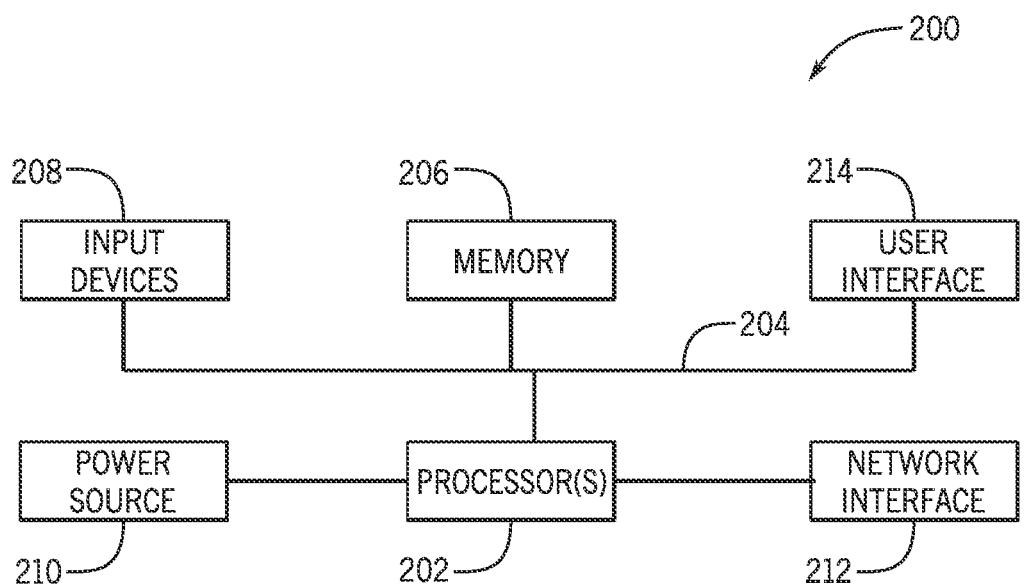
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
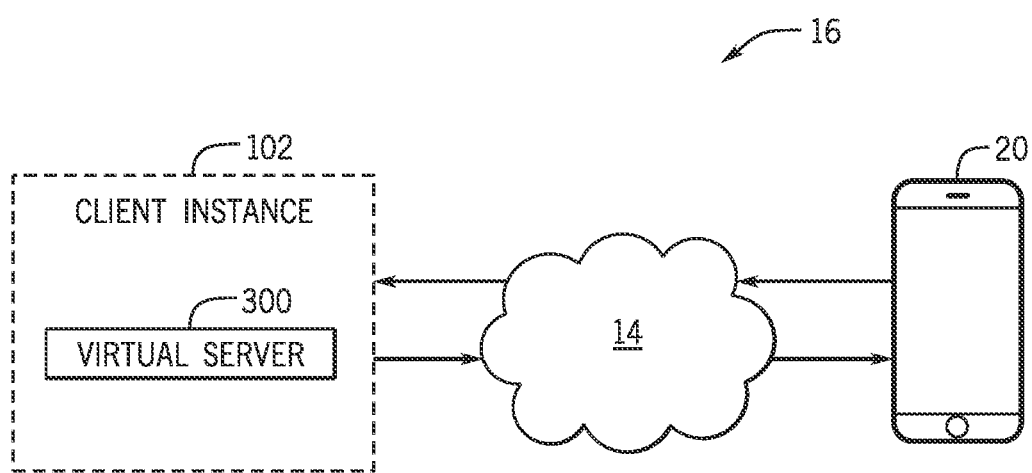
FIG. 4 is a block diagram illustrating an embodiment in which a virtual server supports and enables the client instance, in accordance with aspects of the present disclosure.

FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

With the preceding in mind, the present approach relates to techniques for codifying one or more regulatory policies (via a policy as a code engine) that are then associated with embedded control objectives and mapping the codified policies to software application environments. Upon mapping the codified policies to the software application environments, the written source code for the applications may be compared against the embedded controls (e.g., functions to perform) to ensure that the applications are compliant with the polices (e.g., regulatory policies, IT policies, organizational policies, best practices, ethical standards) employed by the organization. It should be noted that certain aspects of the embodiments described herein may be performed by one or more individuals responsible for maintaining compliance with regulatory policies employed by the organization. For example, an enterprise architect may be responsible for providing standardized pipelines and tooling to application developers such that the developers may develop and deploy applications that are compliant with an organization's policies. Software developers may be responsible for developing and implementing applications and further may be responsible for generating and collecting audit logs for audit processes. Compliance managers of the organization may be responsible for ensuring that an organization's policies, procedures, and developed applications adhere to regulatory and ethical standards and may also be tasked with providing evidence of an organization's compliance with the regulatory and ethical standards.

Turning to FIG. 5, an example is provided of a screen 350 that may be employed by a governance, risk, and compliance (GRC) officer (e.g., compliance manager, enterprise architect) for viewing and/or managing one or more high-level policies 352 employed by an organization to provide services to customers. For example, in the screen 350 an "Information Security and Data Protection Policy" 352 is illustrated and may be associated with regulatory information from the organization and/or from external sources such as the International Organization for Standardization (ISO), and the like. The high-level policy 352 may comprise information associated with a set of standards issued by the organization or a regulatory agency, employee manuals, training manuals, and the like, and the information may define certain policies employed by the organization. The screen 350 may include a number of tabs 354 associated with the high-level policy 352 including an overview tab 355, a policy text tab 356, a control objectives tab 358, a policies tab 360 (e.g., DevOps config. policies tab), a policy exception tab 362, among others.

The overview tab 355 may provide one or more graphical representations (e.g., that provide information indicative of a compliance level of a particular high-level policy 352. The policy text tab 356 may provide information associated with the text of the high-level policy 352. That is, the policy text tab 356 may include a graphical representation of a detailed policy text of the high-level policy 352 with information related to the policy's mission, purpose, scope, and the like. The control objectives tab 358, upon selection, may be configured to provide a compliance officer an ability to associate certain control objectives with a particular high-level policy 352. For example, as illustrated in FIG. 5, upon selection of the control objectives tab 358, a plurality of control objectives 359 associated with the high-level policy 352 may be displayed. As disclosed herein, a "control objective" may refer to a function to be performed to satisfy compliance with a particular high-level policy 352. In some embodiments, the control objectives tab 358 may also include a control 364 (e.g., button) configured to enable a compliance officer to add additional control objectives 359 to a particular high-level policy 352.

The policies tab 360 may include a number of policy as a code engine policies (e.g., PaCE policies, codified policies, DevOps Configuration policies) which may correspond to one or more codified representations of the high-level policy 352. The PaCE policies may include a repository of codified representations of each of the high-level policies 352 and/or ethical standards employed by an organization. That is, the present techniques and systems may employ a policy as a code engine (PaCE) configured to codify and execute representations of the policies and ethical standards that govern the organization. After the PaCE policies are enabled, a compliance manager may be responsible for associating certain control objectives 359 with the PaCE policies, thereby embedding the PaCE policies with preventative controls. In this way, the PaCE policies may be mapped to and/or associated with an application environment (e.g., deployable) to determine whether aspects of the application (e.g., the underlying computer code of the application) satisfy the control objectives 359, thereby enabling a determination of whether the application is compliant with the high-level policy 352, as described in greater detail below.

Figure 6:
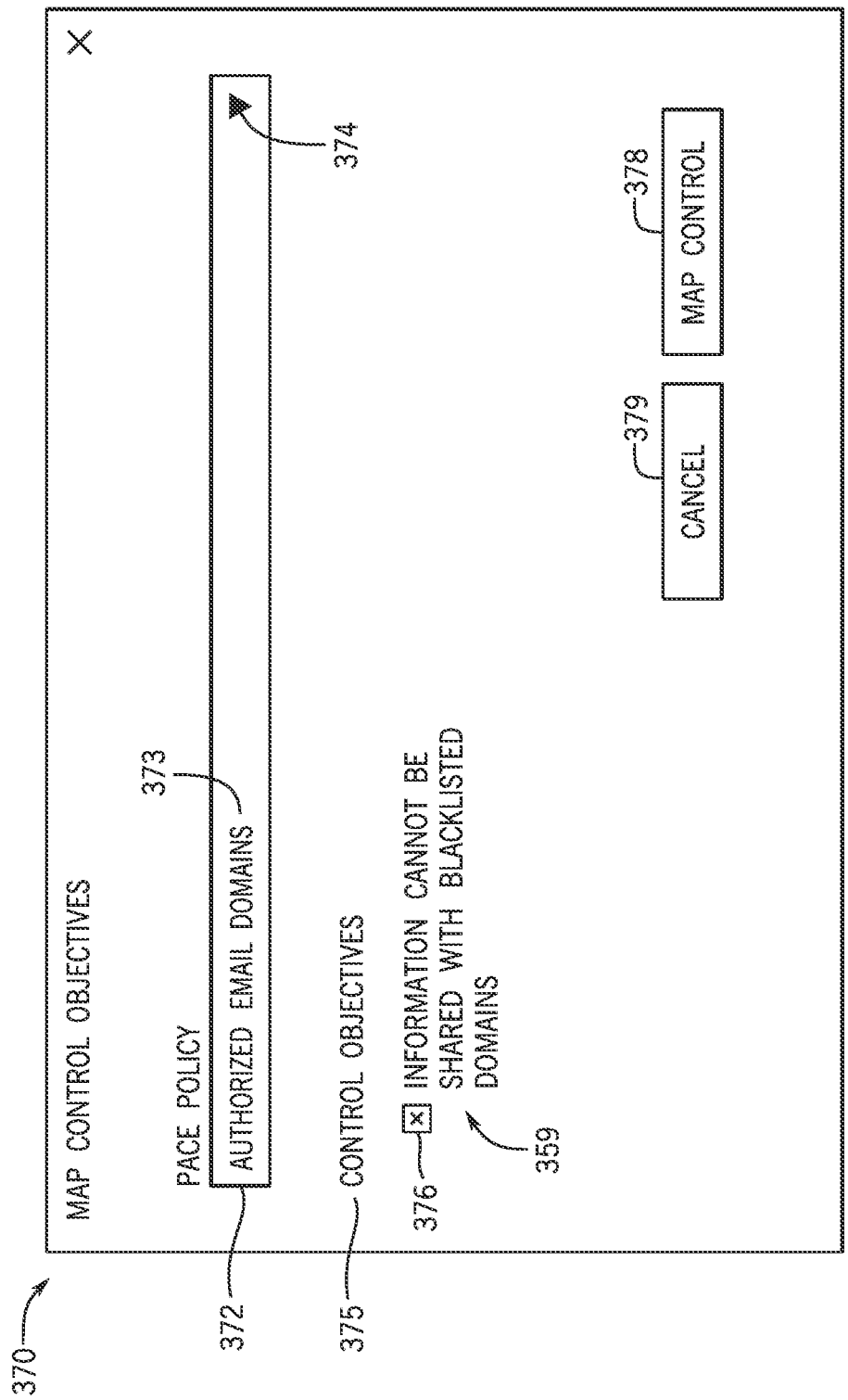
FIG. 6 depicts an example of a screen for mapping and associating one or more control objectives to a policy as a code engine policy, in accordance with aspects of the present disclosure.

Turning to FIG. 6, an example is provided of a screen 370 that may be displayed upon selecting a particular control objective 359. For example, in the illustrated embodiment, the "Information cannot be shared with blacklisted domains" control objective 359 is selected. The screen 370 may include a PaCE policy field 372 with a selectable control 374 (e.g., drop down menu control) configured to, upon selection, enable a compliance manager to view each of the available PaCE policies 373 available for selection. As illustrated, the "authorizedEmailDomains" PaCE policy 373 is selected and a menu 375 may be configured to display the control objectives 359 available for association with the PaCE policy 373. The screen 370 may also include an indicator 376 (e.g., selectable button) configured to enable a compliance manager to make a selection of one or more of the control objectives 359 listed in the menu 375. After selecting a particular control objective 359 via the indicator 376, the compliance manager may select a mapping control 378 (e.g., mapping button) to associate the control objective 359 with the PaCE policy 373, thereby associating a PaCE policy with embedded preventative controls that may be utilized to evaluate compliance of a particular application environment, as described in greater detail below. That is, associating one or more control objectives 359 with a PaCE policy 373 may provide business and regulatory context for the PaCE policy 373 such that the PaCE policy may be mapped to application environments to determine whether the applications are adhering to the various control objectives 359 associated with the PaCE policy 373. In some embodiments, the screen 370 may also include one or more "cancel" controls 379 configured to enable a compliance manager to return to the screen 350 of FIG. 5.

Figure 7:
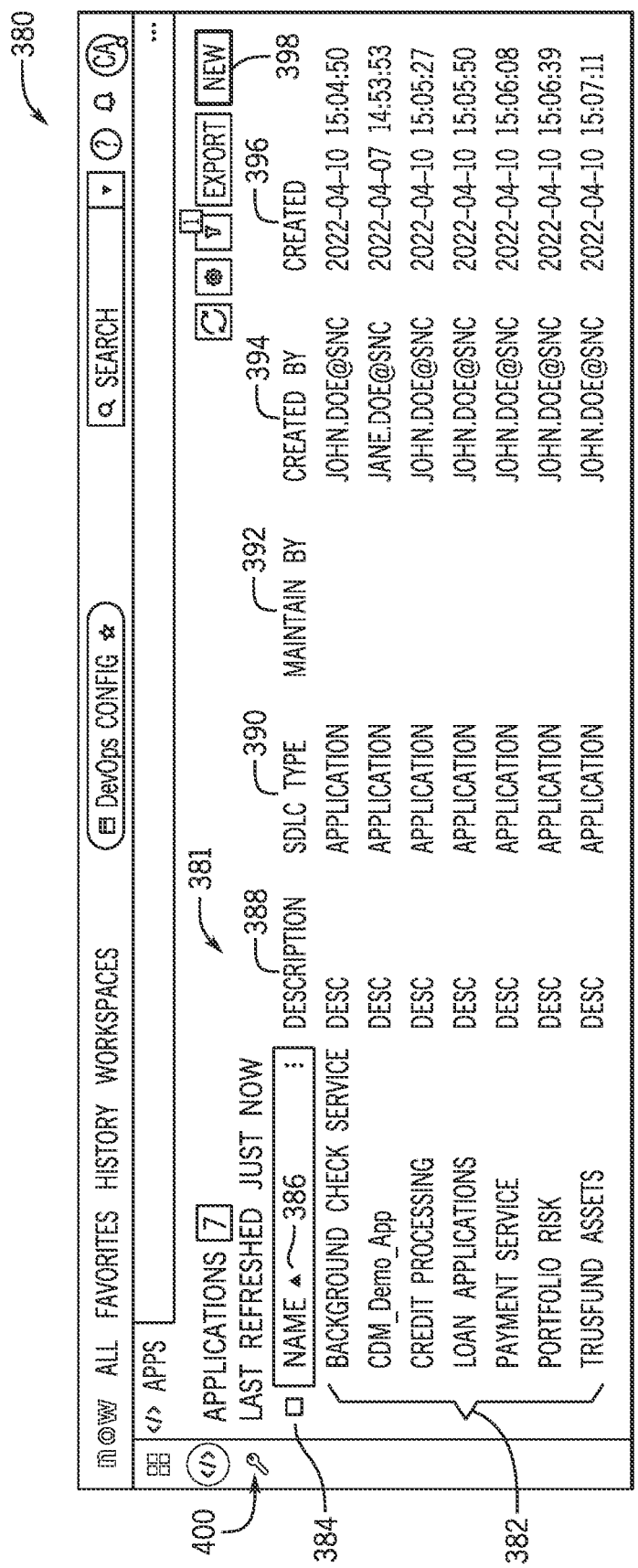
FIG. 7 depicts an example of a screen for reviewing and managing one or more applications available for deployment, in accordance with aspects of the present disclosure.

Turning now to FIG. 7, an example is provided of a screen 380 that may be employed for viewing and/or managing one or more applications 382 deployed by an organization to provide services to clients and/or customers of the organization. In this example, the various applications 382 (here depicted as accessible links to a respective application) are arranged in a table 381 by fields 384 including a name field 386, a description field 388, a type field 390, a maintenance field 392, a created by field 394, and a date field 396. The applications 382 listed in the table 381 represent applications that may be edited and/or modified by a developer, as described in greater detail below.

The name field 386 may provide a name of a respective application 382, while the description field 388 may provide information associated with tasks a respective application 382 performs, services provided by the respective application 382, and the like. The type field 390 may be indicative of a particular type of application, while the maintenance field 392 may provide information related to an individual responsible for maintenance of the application 382 after deployment. The created by field 394 may provide information associated with an individual (e.g., developer) responsible for writing the application 382, and the date field 396 may be indicative of a date that a respective application 382 was created. Further, options to add (control 398) a new application 382 are also provided. As noted above, each of the applications 382 may comprise an accessible link configured to enable a representative of the organization to modify and/or regulate a particular application 382 by associating one or more PaCE policies 373 (with embedded preventative controls) with a particular application 382. The screen 380 may also include an administrative control 400 (e.g., administrative tool) configured to enable a representative of the organization (e.g., compliance manager, compliance officer, enterprise architect) to view and/or manage one or more PaCE policies 373 available for mapping to a particular application environment.

Figure 8:
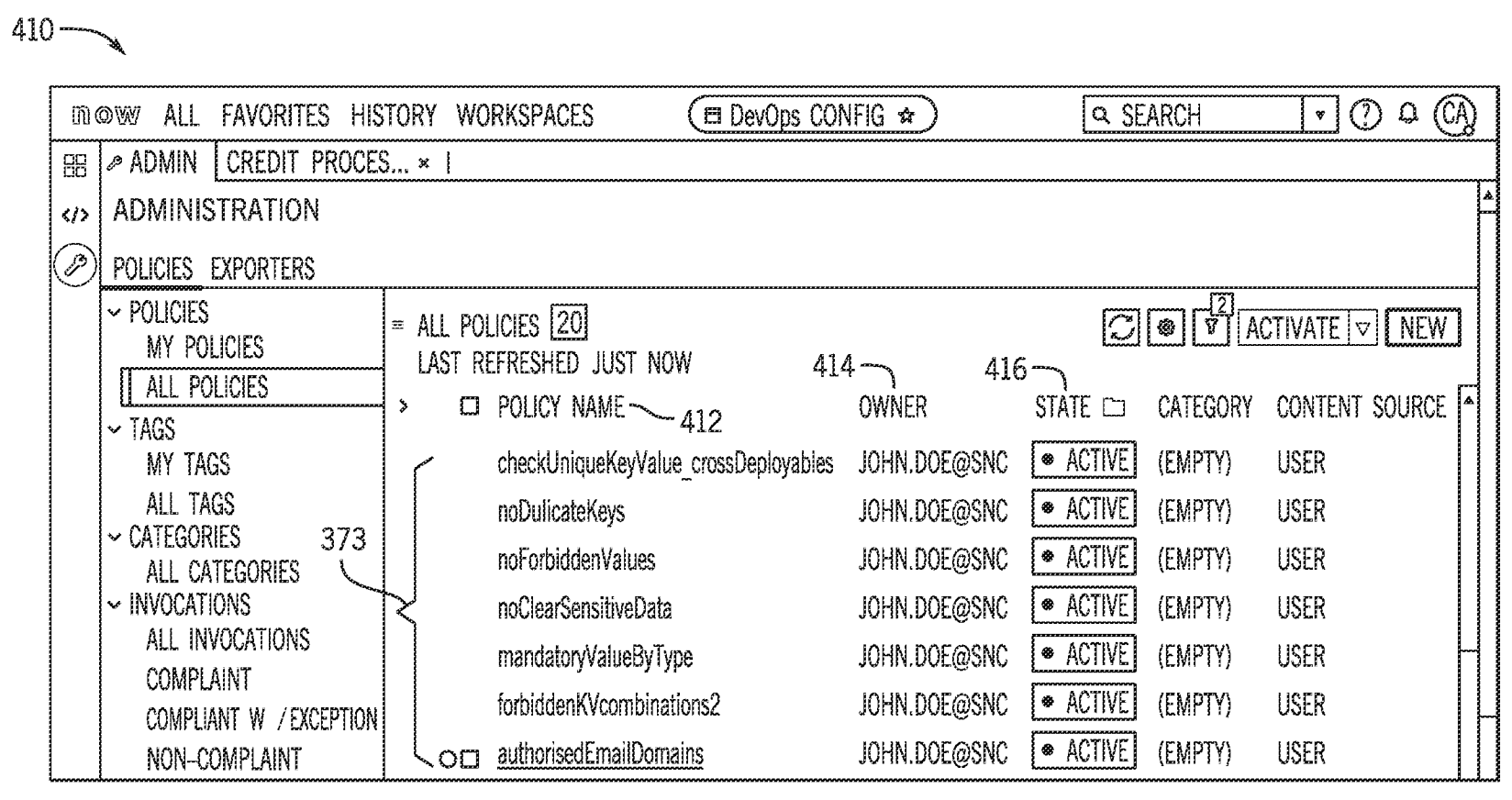

Turning to FIG. 8, upon selection of the administrative control 400, a screen 410 may be displayed. The screen 410 may include each of the PaCE policies 373 generated by the policy as a code engine, which correspond to codified representations of the regulatory policies and ethical standards employed by the organization. As noted above, one or more of the PaCE policies 373 may be associated with various control objectives 359 and thus may include embedded controls configured to limit development of non-compliant applications. The screen 410 may include a name field 412 that provides information associated with a name of a particular PaCE policy 373, an owner field 414 indicative of an individual responsible for generating the PaCE policy (e.g., responsible for associating certain control objectives 359 with a PaCE policy), and a state field 416 indicative of whether the PaCE policy 373 is active or inactive.

Figure 9:
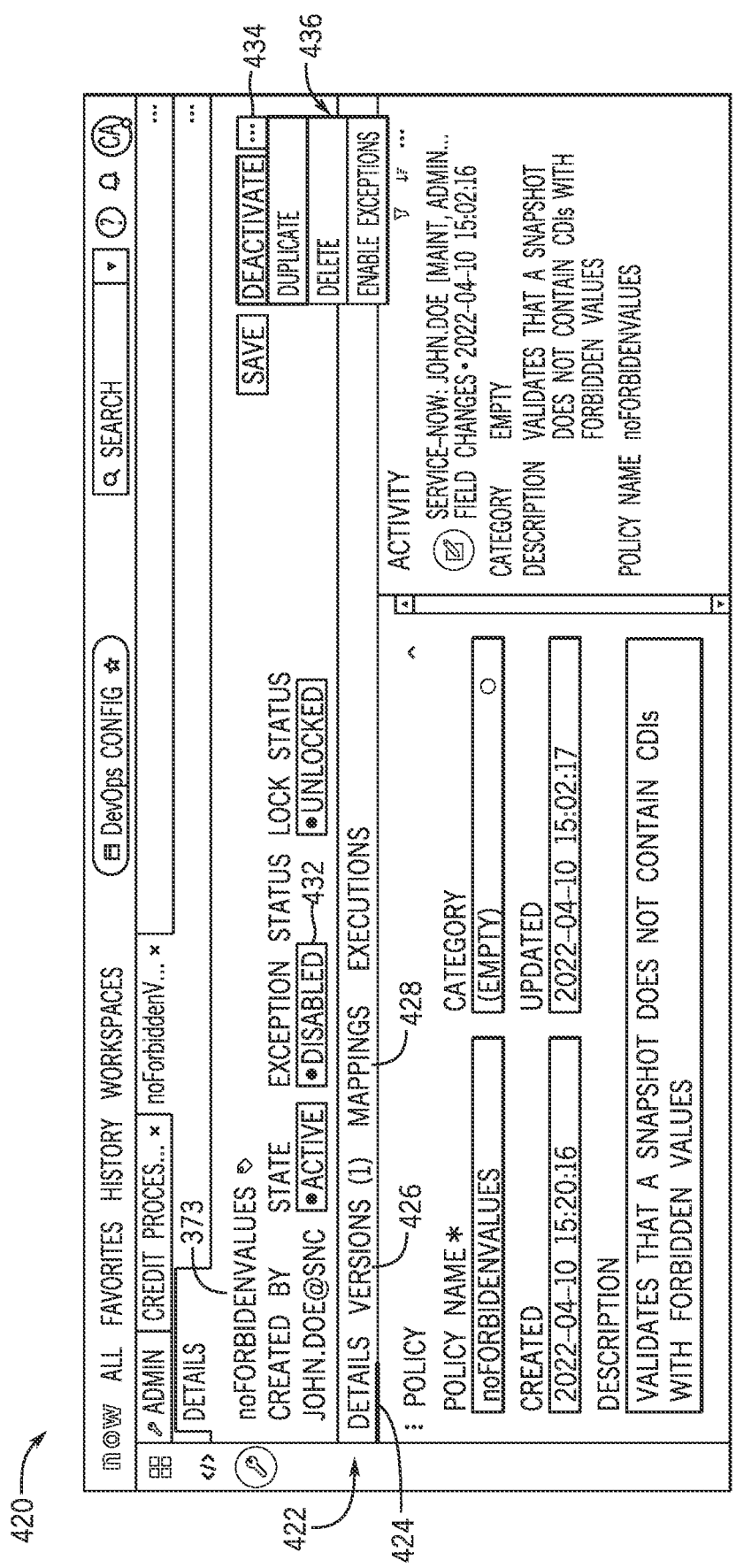
FIG. 9 depicts an example of a screen for reviewing and managing a particular policy as a code engine policy, in accordance with aspects of the present disclosure.
Figure 10:
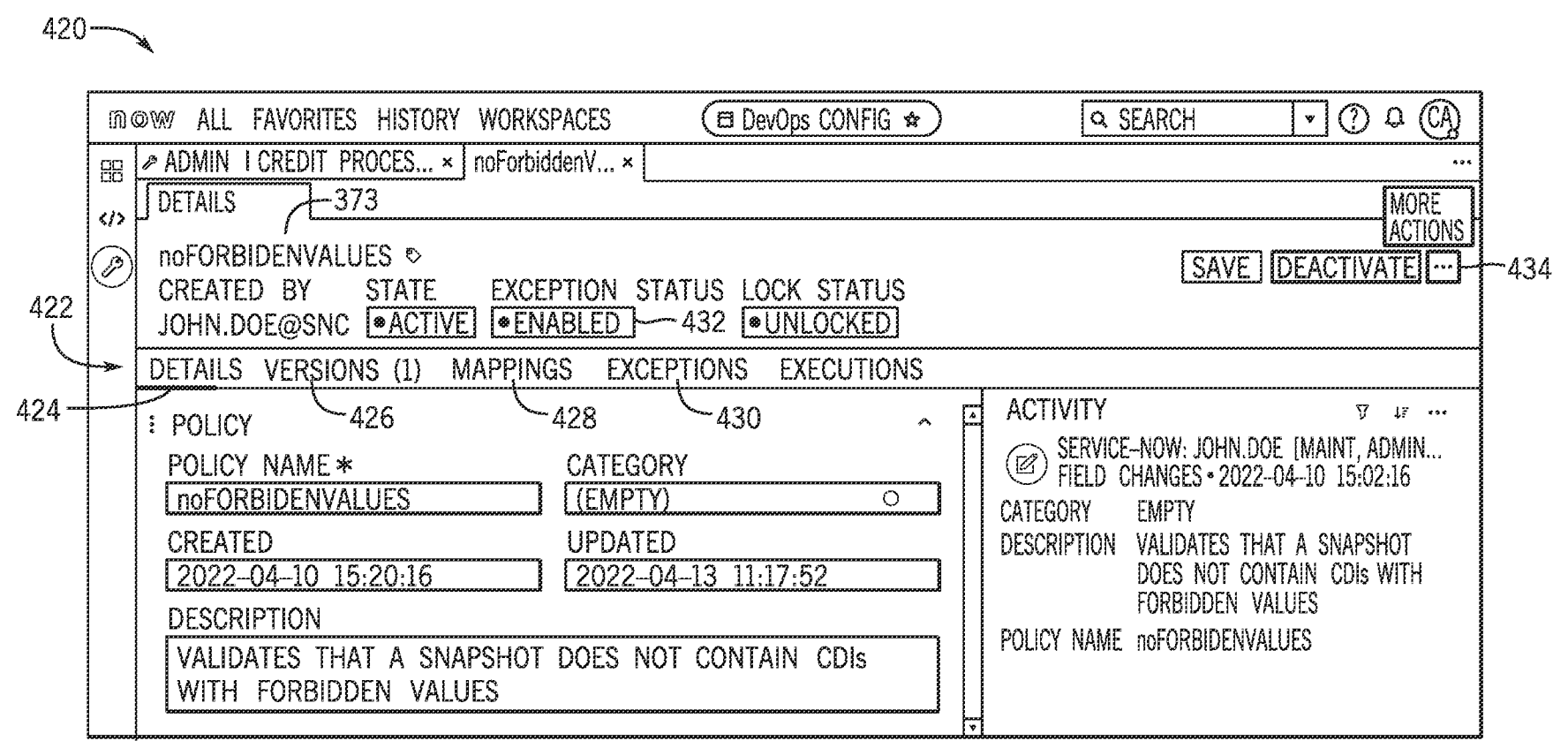

As illustrated in FIG. 9, upon selection of a particular PaCE policy 373 in FIG. 8, a screen 420 may be displayed. The screen 420 may provide information related to the particular PaCE policy 373 selected. For example, as illustrated in FIG. 10, the "noForbiddenValues" PaCE policy 373 is selected. The screen 420 may include a number of pages 422 that may each include information associated with the particular PaCE policy 373 selected. For example, a details page 424 may include information related to a name of the PaCE policy 373, a category of the PaCE policy 373, a creation date of the PaCE policy 373, a modification date of the PaCE policy 373, and/or a brief description of the PaCE policy 373. A versions page 426 may include information related to each version of the PaCE policy 373 that has been generated. That is, each time a new control objective 359 is associated with a particular PaCE policy 373, a new version of the PaCE policy 373 may be generated and the new version may include the updated association with the new control objective 359. A mappings page 428 may include information associated with each of the control objectives 359 that are mapped to the PaCE policy 373 and/or information indicative of which application environments the PaCE policy 373 is associated with.

In some embodiments, the screen 420 may also include an exception status field 432 configured to enable an enterprise architect or a compliance manager to determine whether a particular PaCE policy 373 is associated with any control objectives 359 and/or whether the PaCE policy 373 is enabled for requesting exceptions to the associated control objectives 359. For example, a PaCE policy 373 that has not yet been associated with any control objectives 359 and has not been enabled for exceptions may display an exception status as "Disabled." A PaCE policy 373 that has been enabled for exceptions, but is still not yet associated with any control objectives 359 may display an exception status as "Enabled." A PaCE policy 373 that has been associated with one or more control objectives 359 and has been enabled for exceptions may display an exception status as "Enabled and Configured." Thus, improved visibility for an enterprise architect tasked with reviewing policy execution may be provided. In some embodiments, an activation control 434 may be included on the screen 420 and may be configured to enable a representative of the organization (e.g., enterprise architect) to activate or deactivate exceptions for a particular PaCE policy 373.

Upon selection of the activation control 434, a drop down menu 436 may be displayed that provides an option for enabling exceptions. As illustrated in FIG. 10, after selecting the "Enable exceptions" option, the exception status field 432 may be updated to reflect that exceptions have been enabled (e.g., exception status field 432 displays "Enabled"). Further, upon selecting the "Enable exceptions" option, an exceptions page 430 may be generated and may include information indicative of whether any exceptions are active for a particular PaCE policy 373 and/or the associated application environment in which the exception is active. Notably, the exception status field 432 of FIG. 10 denotes the "noForbiddenValues" PaCE policy 373 as being "Enabled," but does not include an indication that the "noForbiddenValues" PaCE policy 373 has been configured. As noted above, such a status (i.e., "Enabled" status) may indicate that while the PaCE policy 373 has been enabled for exceptions, no control objectives 359 have yet been mapped to the PaCE policy 373. Such information may be useful for an enterprise architect and/or a compliance manager tasked with evaluating an organization's compliance with the regulations and standards employed by the organization.

Figure 11:
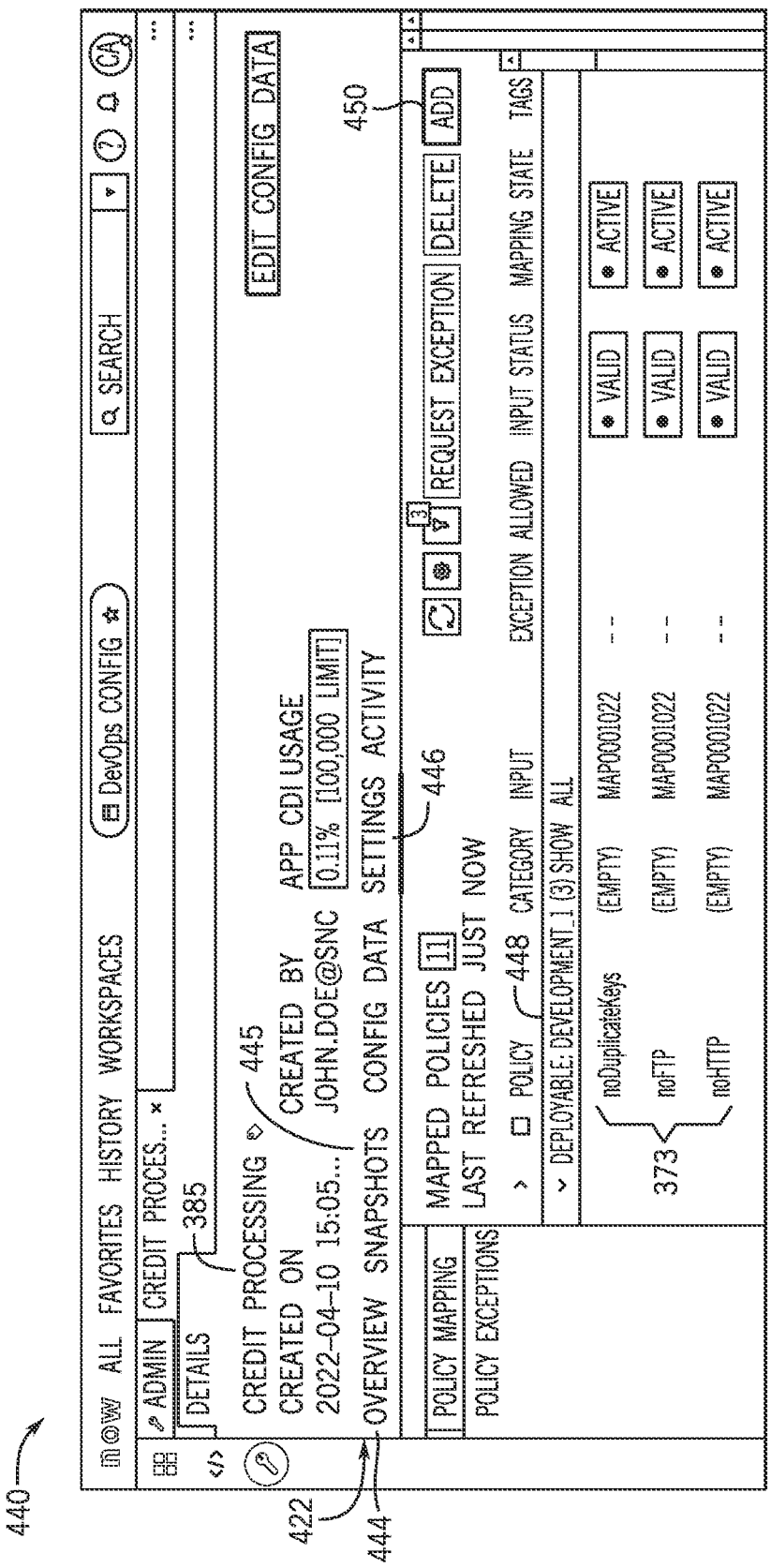
FIG. 11 depicts an example of a screen for reviewing and managing one or more policy as a code engine policies, in accordance with aspects of the present disclosure.

Turning to FIG. 11, upon selection of one of the applications 382 displayed in the screen 380 of FIG. 7, a screen 440 may be displayed. For example, as illustrated in FIG. 11, the "Credit Processing" application 382 is selected and information associated with the Credit Processing application 382 is displayed. The screen 440 may include a number of pages 442 including an overview page 444 that may include the application name, an individual responsible for creating and/or maintaining the application 382, and/or a description of the application 382 that provides information associated with which services the application performs. As illustrated, the screen 440 may also include a snapshot page 445 and a settings page 446 which, upon selection, may display information indicative of which PaCE policies 373 are mapped to application environments associated with the application 382. That is, the application 382 may be associated with one or more deployables 448 (e.g., application environments) in which the application 382 is tested and/or deployed. For example, the application 382 may be associated with one or more production deployable environments 448, one or more development deployable environments 448, and/or one or more test deployable environments 448.

Figure 12:
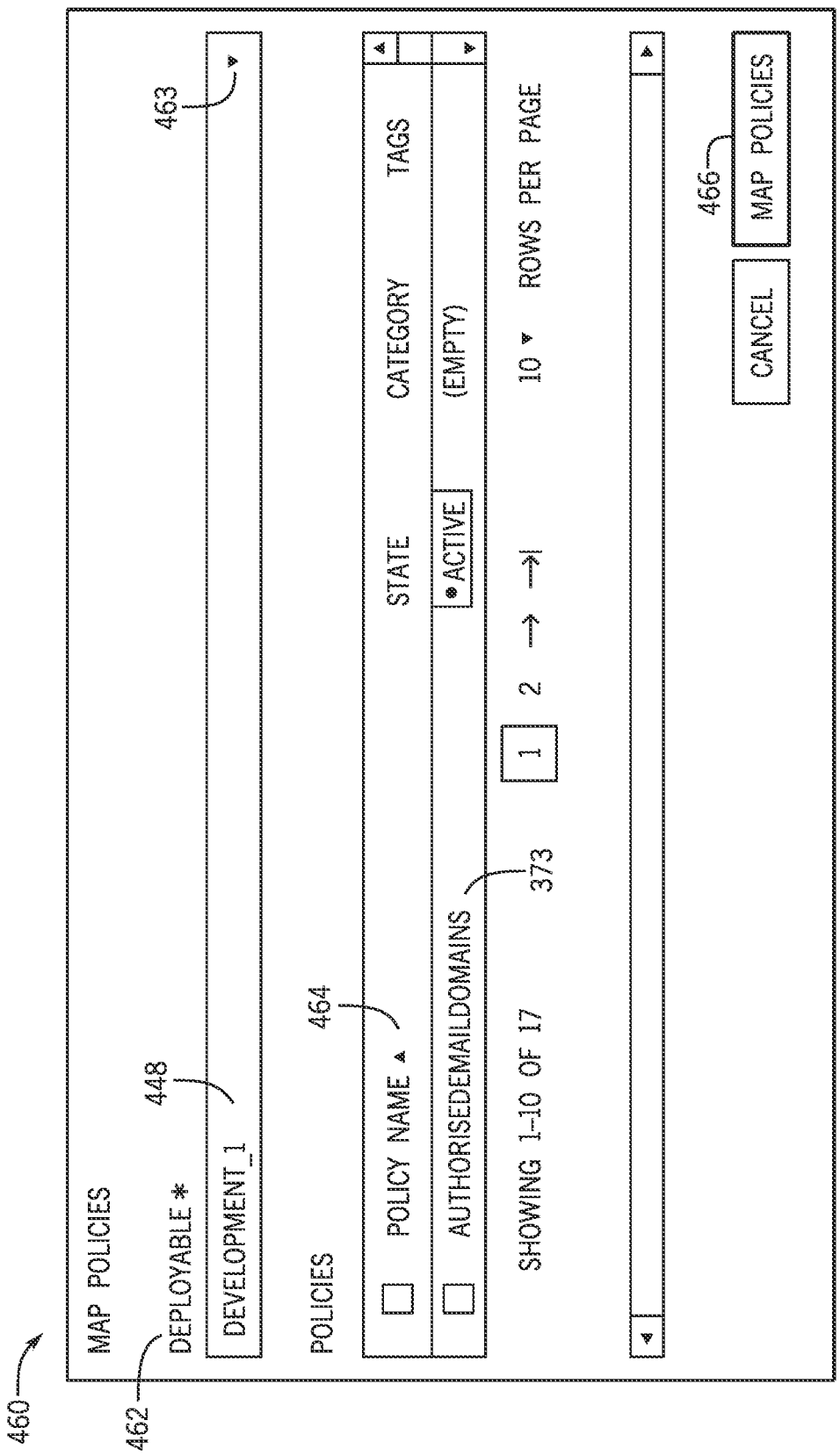
FIG. 12 depicts an example of a screen for adding one or more policy as a code engine policies to an application environment, in accordance with aspects of the present disclosure.

As shown in FIG. 11, the "Credit Processing" application 382 is associated with a "Development" deployable 448, and the "Development" deployable 448 is associated with three different PaCE policies 373. In some embodiments, the screen 440 may include a control 450 configured to enable an enterprise architect to map or associate different PaCE policies 373 to a particular deployable 448. For example, as shown in FIG. 12, upon selection of the control 450, a screen 460 may be displayed for mapping one or more PaCE policies 373 to a particular deployable 448. The screen 460 may include a deployable field 462 with a selectable control 463 (e.g., drop down menu) configured to enable a representative of the organization (e.g., enterprise architect) to view each of the available deployables 448 (e.g., application environments) with which the application 382 is associated. For example, in the illustrated embodiment, the "Development 1" deployable is selected and a menu 464 may be configured to display the PaCE policies 373 available for association with a particular deployable 448. After selecting a particular PaCE policy 373 to map to a selected deployable 448, a representative of the organization may select a mapping control 466 to associate (e.g., map) the PaCE policy 373 with the selected deployable 448.

Figure 13:
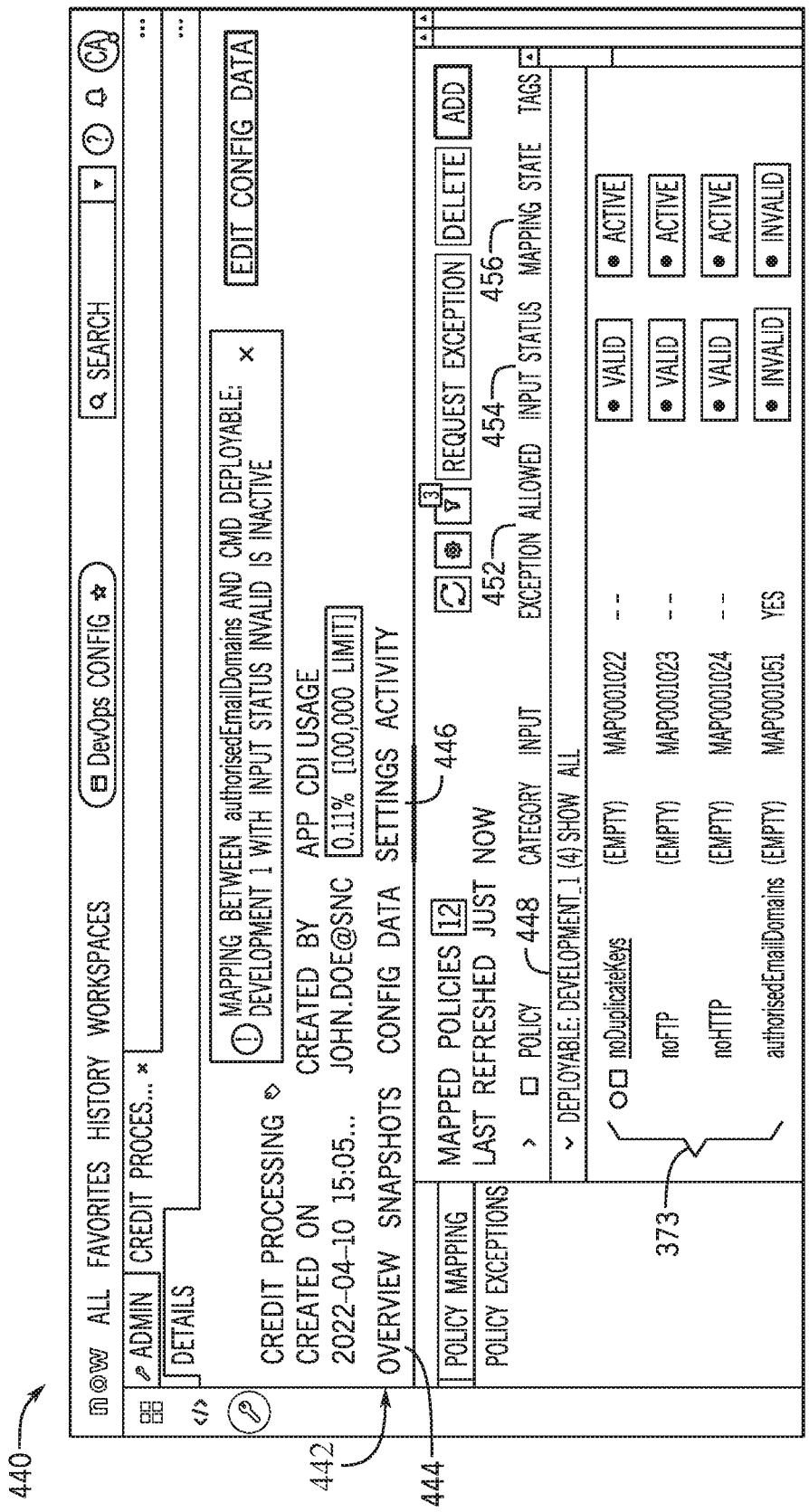
FIG. 13 depicts the screen of FIG. 11 with a policy as a code engine policy mapped to a particular application environment, in accordance with aspects of the present disclosure.

As illustrated in FIG. 13, upon mapping a PaCE policy 373 to a particular deployable 448, the screen 440 may be updated to include the new PaCE policy 373 (e.g., "authorisedEmailDomains" PaCE policy 373) as associated with the deployable 448 that was selected in FIG. 12. As noted above, by associating one or more control objectives 359 with a particular PaCE policy 373, the PaCE policy 373 may be given business and regulatory context that can be used to test whether applications in a particular application environment are compliant with regulations and standards employed by the organization. In turn, the PaCE policy 373 may be associated with a particular application environment (e.g., deployable 448) such that as developers modify and/or add additional source code a particular application 382, the source code may be compared against the codified PaCE policies 373 to determine whether the source code is compliant with the control objectives 359 associated with each of the PaCE policies 373.

In some embodiments, the screen 440 may also be configured to display an exception status 452, an input status 454, and a mapping status 456 which may provide additional information associated with each of the mapped PaCE policies 373. For example, for the "authorisedEmailDomains" PaCE policy 373 that was added to the Development Deployable 448, the "Yes" in the exception status 452 indicates that exceptions are allowed for the particular PaCE policy 373. The input status 454 may indicate whether the PaCE policy 373 has been configured (e.g., whether input parameters have been applied) and the mapping status 456 may indicate whether the particular PaCE policy 373 is actively mapped to a particular deployable 448. In some embodiments, after one or more input parameters are associated with a particular PaCE policy 373, the input status 454 and the mapping status 456 may be updated to reflect that a particular PaCE policy 373 is now valid and active.

Figure 14:
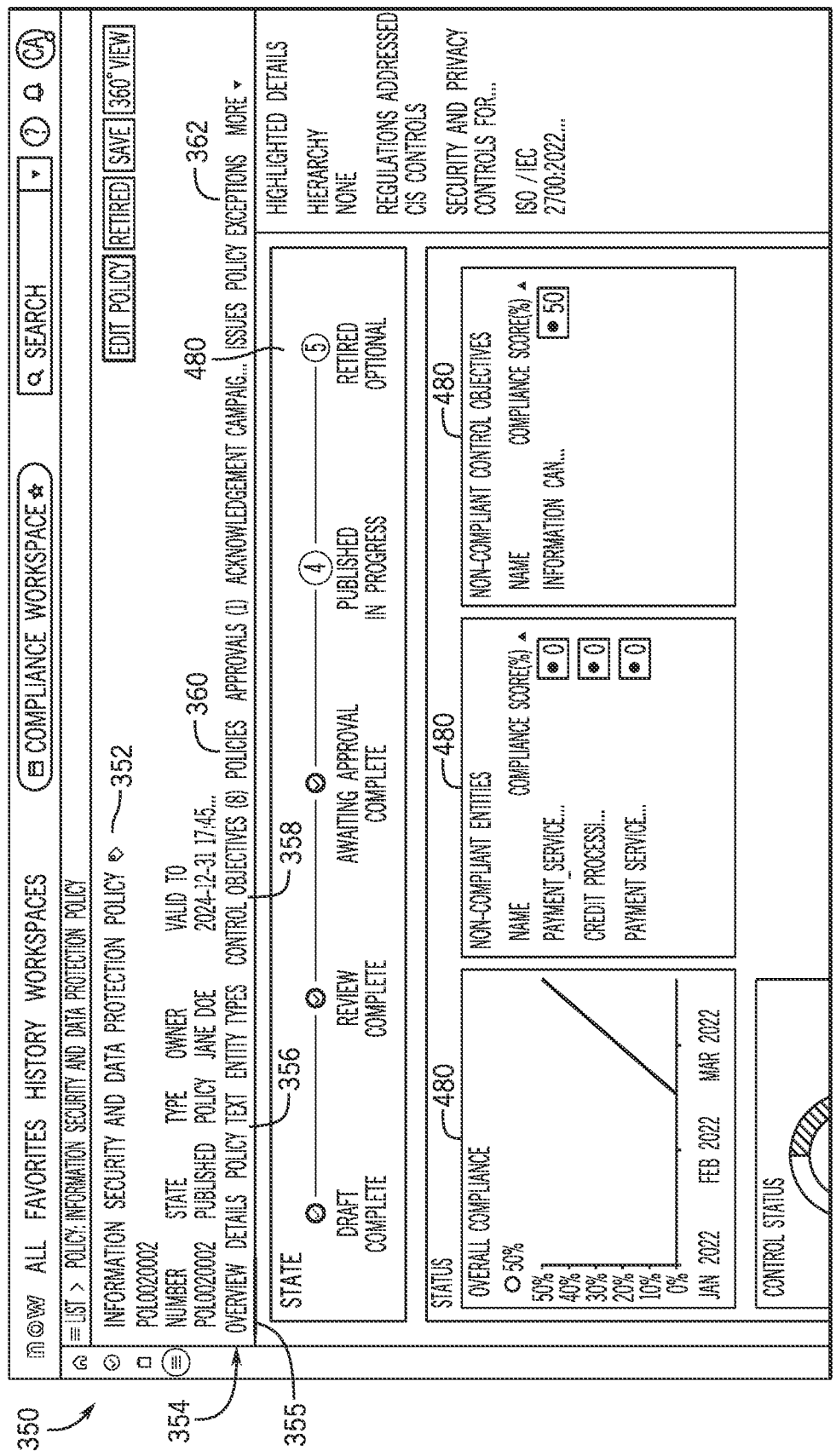
FIG. 14 depicts the screen of FIG. 5 with one or more graphical representations indicative of a compliance level of a policy, in accordance with aspects of the present disclosure.

FIG. 14 is an embodiment of the screen 350 of FIG. 5 with the overview tab 355 displayed. As noted above, the overview tab 355 may include one or more graphical representations 480 that provide information indicative of an amount of compliance with a high-level policy 352. Such graphical representations 480 may provide improved visibility for a compliance manager tasked with determining whether an application is compliant with a particular policy. In some embodiments, the graphical representations 480 may be configured to be displayed on a graphical user interface of a computing device and may be presented to auditors to provide evidence that applications deployed by the organization are compliant with the regulations and standards employed by the organization.

Figure 15:
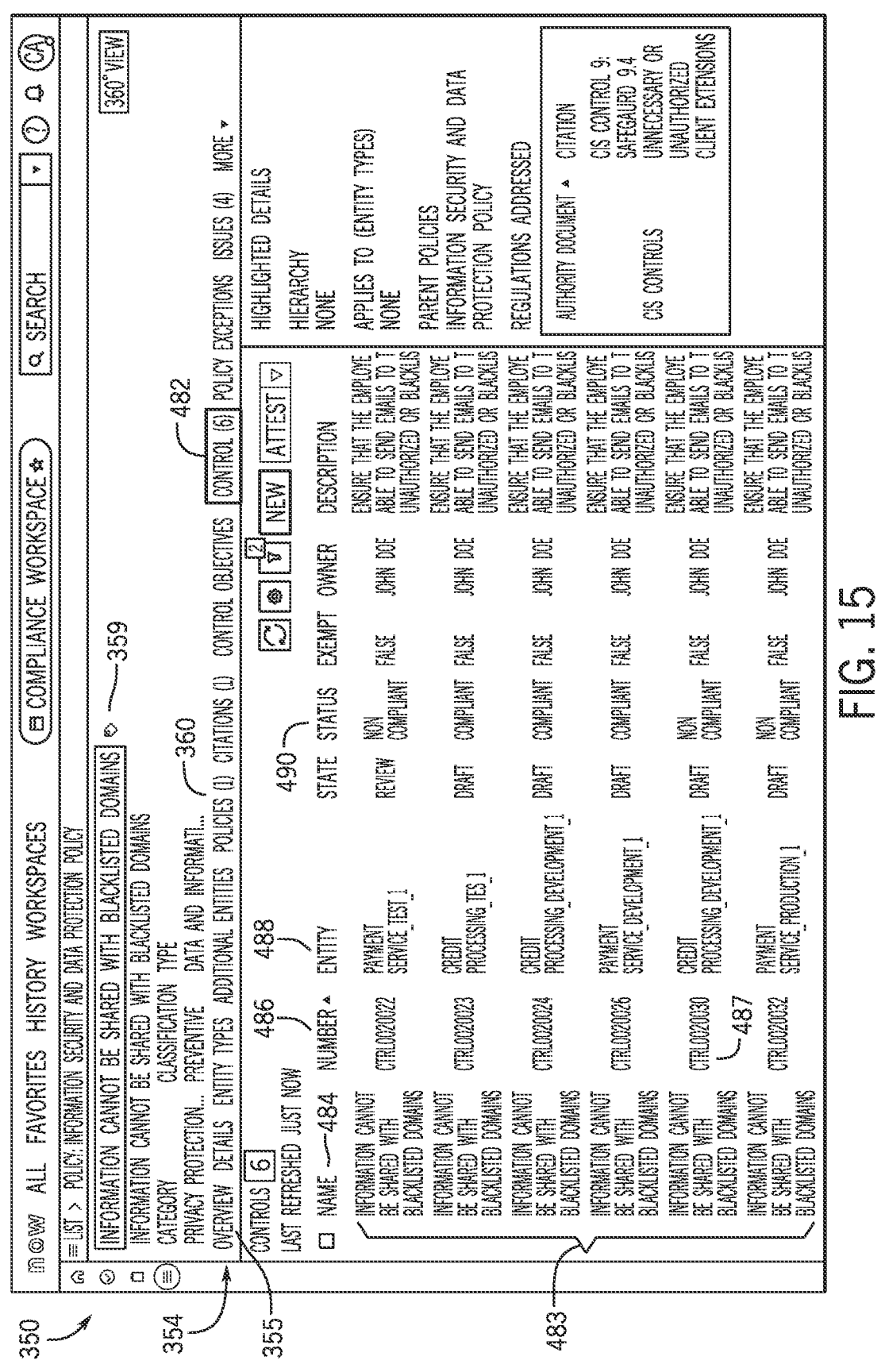

FIG. 15 is an embodiment of the screen 350 of FIG. 5 with the "Information cannot be shared with blacklisted domains" control objective 359 selected. As illustrated, the screen 350 may include the tabs 354 available for selection. Further, upon selection of a particular control objective 359, a controls tab 482 may be displayed. The controls tab 482 may include a number of controls 483 that correspond to specific instances of a control objective 359 applied to a particular application service associated with deployable 448 (e.g., application environment, entity). Indeed, the controls 483 may be similar to the control objectives 359 in that they define functions that must be performed or adhered to in order for an application to remain compliant with a particular policy employed by the organization. The controls tab 482 may include a name field 484 which may provide a name of a particular control 483, a number field 486 which may provide an identifier 487 (e.g., text string, number string) configured to identify a particular control 483, an entity field 488 that includes information related to which deployable 448 (e.g., application service) the control 483 is associated with, and a status field 490 which may provide information indicative of whether a particular control 483 is being violated (e.g., non-compliant). Indeed, as noted above, one or more PaCE policies 373 may be mapped to the one or more control objectives 359 to establish a connection between the one or more control objectives 359 and the PaCE policy 373, and upon mapping a particular PaCE policy 373 with embedded control objectives 359 to a particular deployable 448 (e.g., application service), various controls 483 may be generated. In this way, upon executing a particular application in an application environment, the controls 483 may be evaluated to determine whether each application performed the specific functions specified by the controls 483 in the respective application environment, thereby enabling a determination to be made as to whether the application adheres to the policies employed by the organization.

Figure 16:
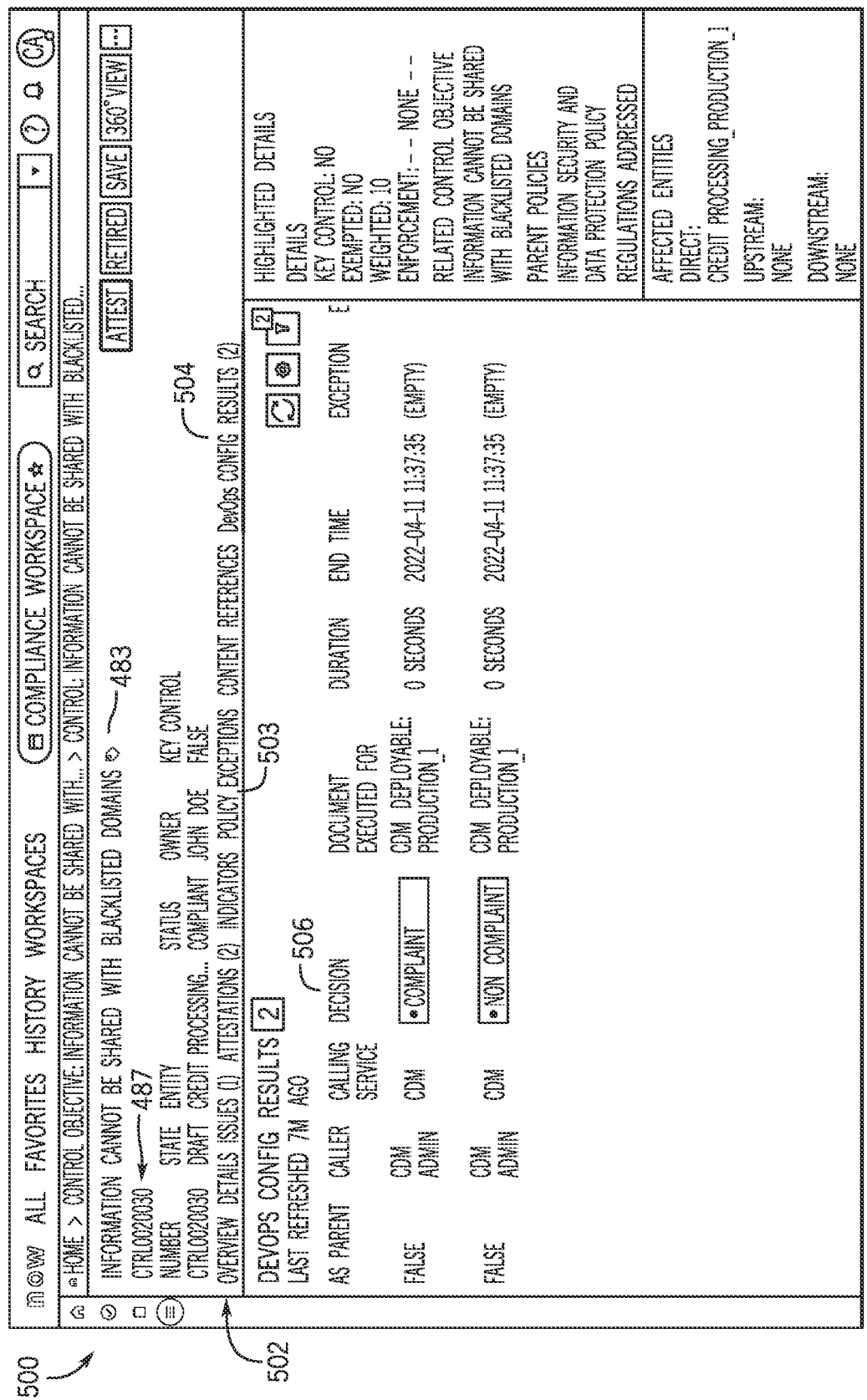
FIG. 16 depicts an example of a screen for reviewing and managing a control, in accordance with aspects of the present disclosure.

For example, as illustrated in FIG. 16, upon selection of a particular control 483, a screen 500 may be displayed that includes a number of tabs 502 associated with the selected control 483. In some embodiments, the screen 500 may include a policy exceptions tab 503 and a DevOps configuration results tab 504 that may be selected to provide information related to whether a specific control 483 was adhered to in a particular application environment (e.g., entity, deployable 448). For example, after mapping PaCE policies 373 with embedded preventative controls 483 to various deployables 448, a developer may configure and execute an application, and the PaCE policies 373 that have been mapped to the deployable 448 in which the application is to be deployed may be checked against the configured application to determine whether the application adheres to the various control objectives 359 embedded within the PaCE policies 373.

In turn, the DevOps configuration results tab 504 may include a decision indicator 506 (e.g., evidence) which may provide an indication as to whether a deployed application within a specific application environment is compliant with the control 483. The decision indicator 506 may provide improved visibility for a compliance manager, thereby enabling a determination to be made as to whether an exception should be granted. That is, information may be displayed in near-real time such that upon determining that an aspect of the application is non-compliant with one or more controls 483 associated with one or more PaCE policies 373, an individual may be notified of the non-compliance. Further, by mapping the PaCE policies 373 with embedded controls 483 to specific application environments, application configuration and development processes may be halted upon determining that an application is non-compliant with a particular PaCE policy 373. In this way, developers may be limited from deploying applications that are non-compliant with regulations and/or policies employed by the organization until an exception is granted. In some embodiments, upon determining that an aspect of a configured application is non-compliant with a PaCE policy 373 and/or a control objective 359, a notification may be sent (e.g., transmitted) to the developer to notify the developer that the application is non-compliant. The notification may include a recommendation to the developer to request an exception to continue the configuration and development process for the application.

Figure 17:
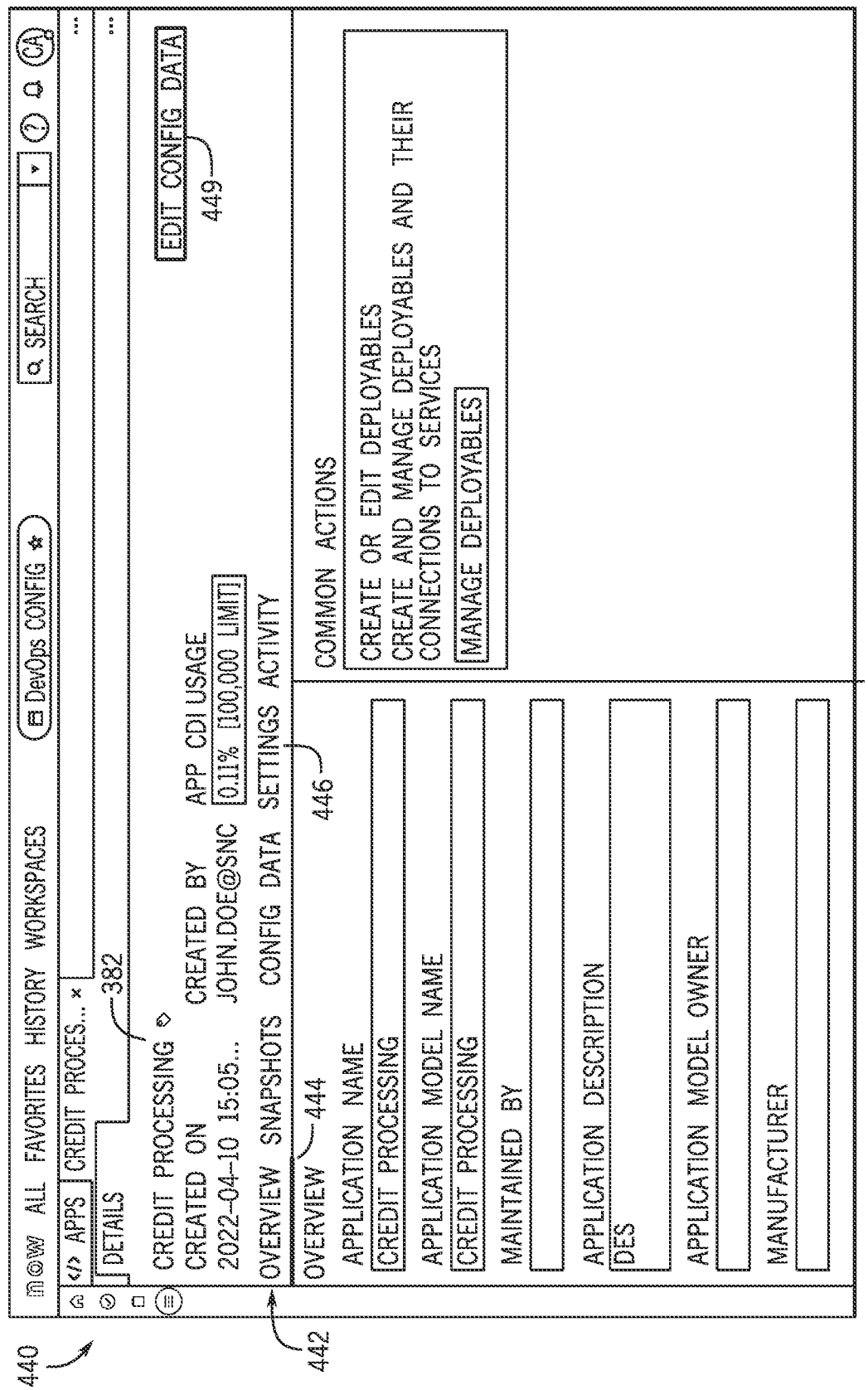
FIG. 17 depicts the screen of FIG. 11 with an overview page displayed, accordance with aspects of the present disclosure.

Turning to FIG. 17, an embodiment of the screen 440 of FIG. 11 is shown. As noted above, the screen 440 may be displayed in response to a selection of one of the applications 382 available for modification and/or deployment. For example, the screen 440 may be displayed upon selection of the "Credit Processing" application 382 displayed in FIG. 7. In some embodiments, when a developer wishes to make a change or add a new feature to a particular application 382, the developer may select an edit control 449 configured to enable the developer to create a change set (e.g., a modified version of the application 382). The change set may then be tested against the various PaCE policies 373 and control objectives 359 to determine whether the changes and/or modifications applied to the application 382 are compliant with the policies employed by the organization.

Figure 18:
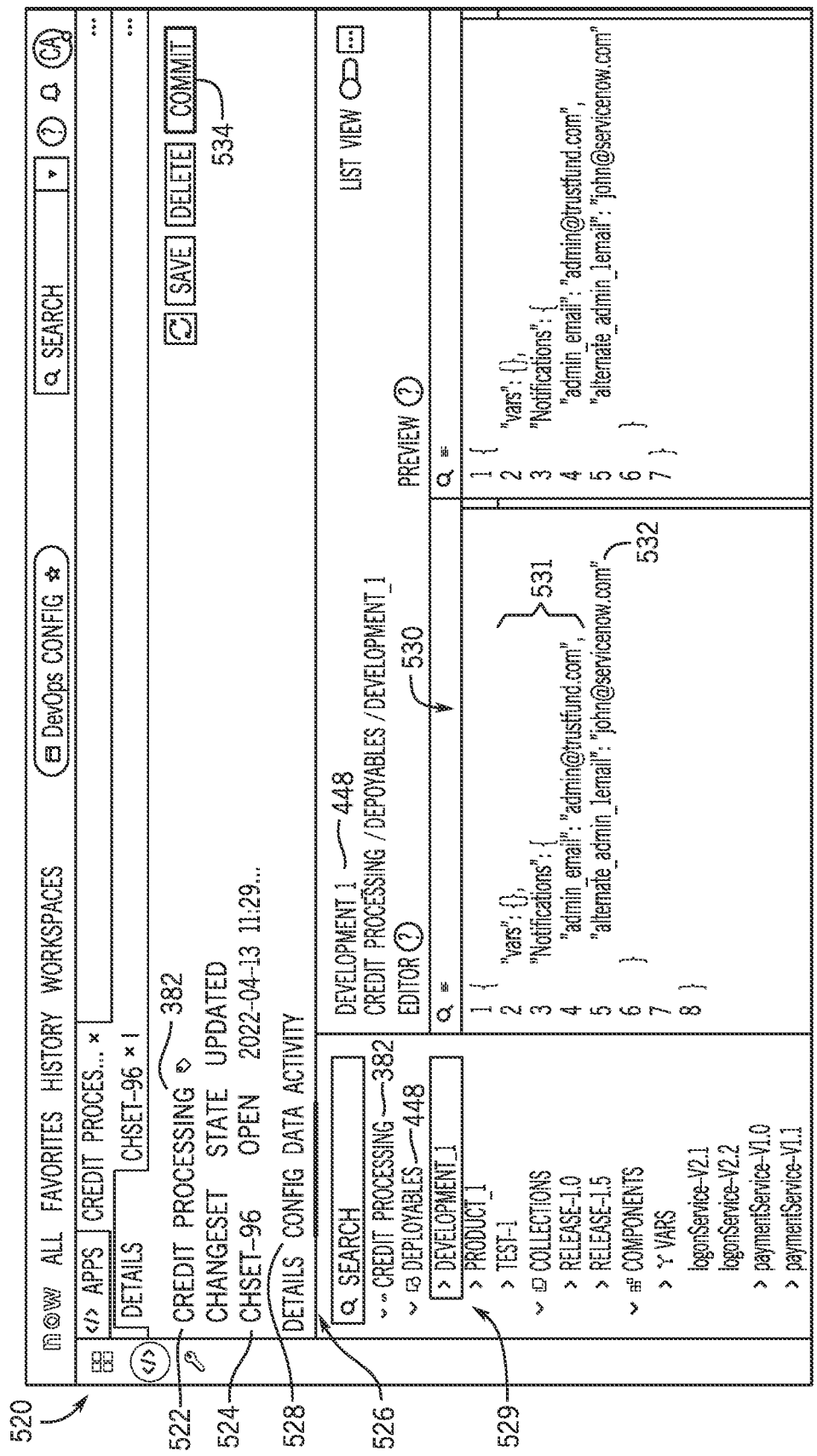
FIG. 18 depicts an example of a screen for generating and applying a change set, in accordance with aspects of the present disclosure.

For example, a developer may wish to add a notification feature to the credit processing application 382. As illustrated in FIG. 18, upon selection of the edit control 449, the developer may be presented with a screen 520 configured to enable the developer to add additional source code (e.g., a change set) to the application 382. The screen 520 may include a first indication 522 of the particular application being modified (i.e., credit processing application 382), and a second indication 524 indicative of which change set the developer is working on (e.g., "Chset-96"). The screen 520 may also include a number of pages 526 associated with the respective change set including a configuration data page 528. As illustrated in FIG. 18, the configuration data page 528 may include an application environment section 529 that enables a developer to select a particular deployable 448 in which to deploy the change set. For example, FIG. 18 illustrates the "Development 1" deployable selected such that the change set generated by the developer may be tested in the Development_1 deployable 448.

Figure 19:
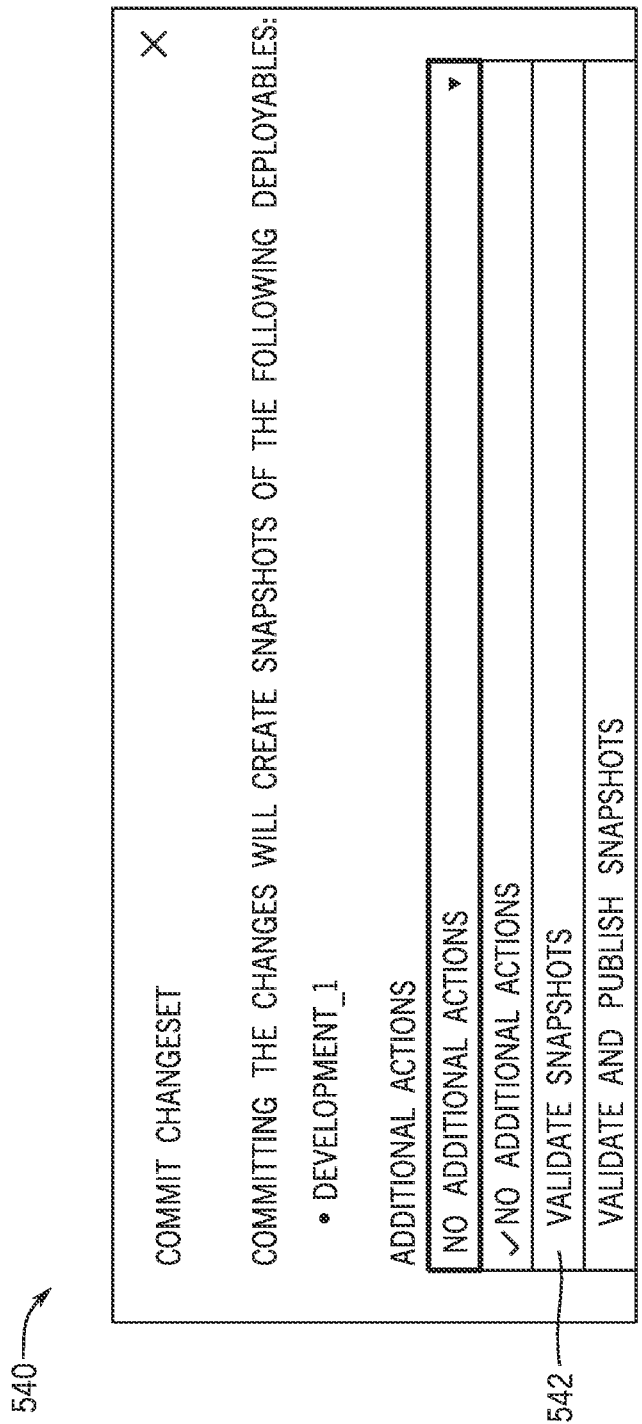
FIG. 19 depicts an example of a screen for validating a change set, in accordance with aspects of the present disclosure.

Upon selection of a particular deployable 448, the screen 520 may display an edit area 530 configured to enable a developer to draft new source code (e.g., a change set) for a particular application 382 that may be tested against the regulations and policies employed by the organization prior to deploying the application 382. Indeed, as illustrated in FIG. 18, the developer has added a new configuration item 532 to the source code 531 of the credit processing application. In the illustrated embodiment, the new configuration item 532 corresponds to the developer's attempt to add a new email domain for notifications to be sent to. After selecting a particular deployable 448 in which to deploy the change set, and after drafting the change set, the developer may elect to commit and validate the change set to evaluate whether the change set is compliant with the PaCE policies 373 mapped to that particular deployable 448. For example, a commit control 534 may become available in response to drafting a change set in the edit area 530. Upon selection of the commit control 534, a menu 540 may be displayed (shown in FIG. 19) that includes an option 542 configured to validate a snapshot (e.g., a change set). The menu 540 may also provide an indication as to which deployable 448 the change set is to be applied.

Figure 20:
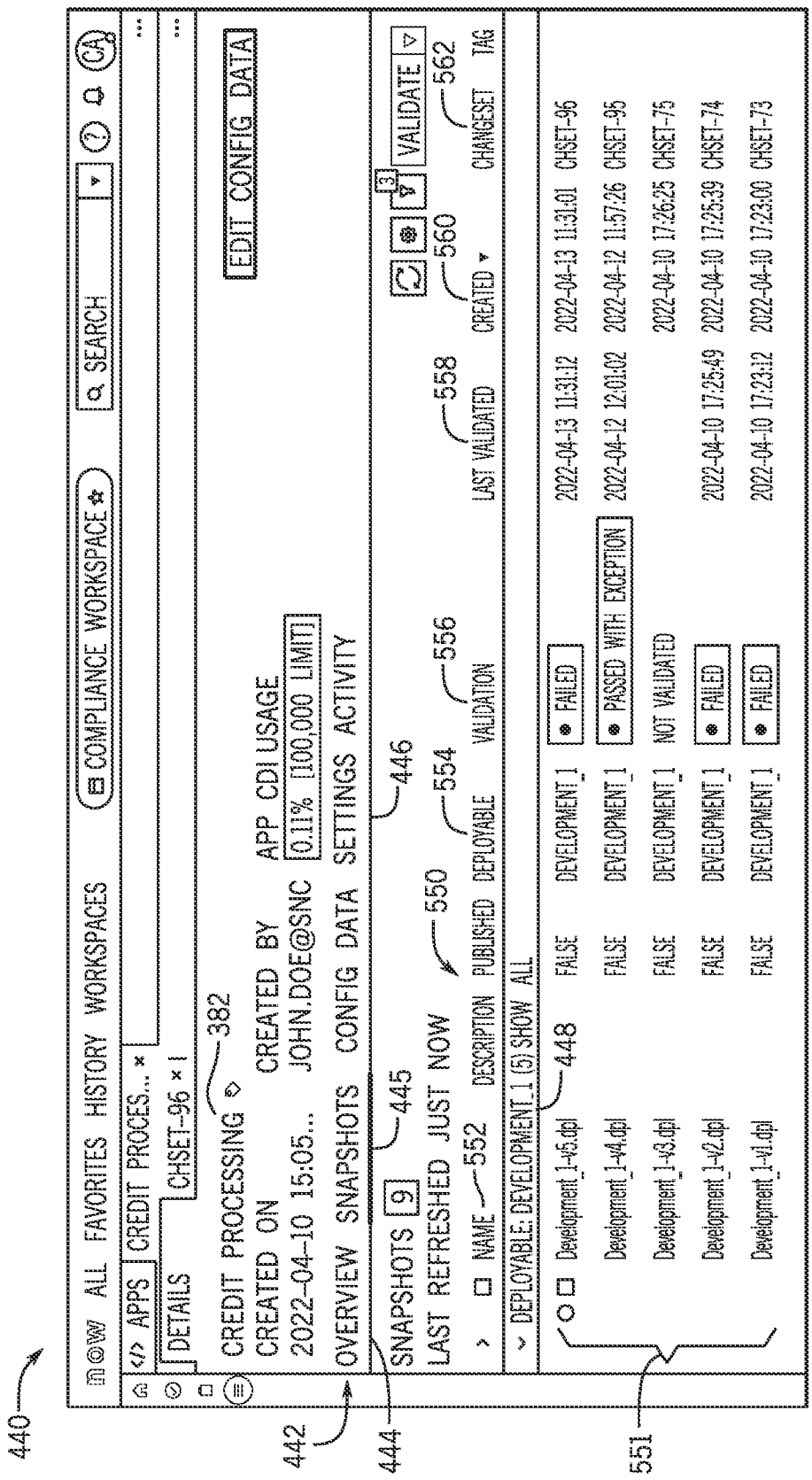
FIG. 20 depicts the screen of FIG. 11 showing a snapshots page, in accordance with aspects of the present disclosure.

Turning to FIG. 20, the screen 440 is shown with the snapshots page 445 selected. As illustrated, the snapshots page 445 may include a list 550 of each of the change sets 551 (e.g., versions) associated with the application 382 and the respective deployable 448 in which the change set was deployed. For example, FIG. 20 illustrates five different change sets 551 that were applied to the credit processing application 382. The list 550 may include a name field 552 that provides identifying information for each particular change set 551, a deployable field 554 that indicates which deployable 448 the change set 551 is associated with, and a validation field 556 that indicates whether the change set is compliant with the policies and regulations employed by the organization. The list 550 may also include a validation date field 558 that provides information related to the last date that the change set 551 was validated, a creation field 560 indicative of a date the change set was created, and a Changeset field 562 that provides an identifier associated with a particular change set 551. Indeed, the snapshots page 445 of the screen 440 may provide important information regarding non-compliant aspects of a particular application 382 such that a developer may easily ascertain where certain issues lie, thereby enabling the developer to address the issues and/or request exceptions to continue modifying other aspects of the application 382.

With specific reference to the "Chset-96" which corresponds to the change set created in FIG. 18, the validation field 556 indicates that the "Development_1-v5" change set 551 failed validation. Such an indication may indicate that the particular change set 551 did not adhere to one or more of the PaCE policies 373 that were mapped to the deployable 448 in which the change set 551 was applied. That is, each of the mapped PaCE policies 373 in a respective deployable 448 may be executed against the change set 551 to determine whether the change set 551 violates any of the PaCE policies. Such an indication may also alert the developer that the associated change set has a compliance issue that must be resolved before the developer can continue developing the application. In this way, developers may be made aware of non-compliant aspects of applications before deploying applications to customers of the organization. Further, such an indication may also notify the developer that an exception should be requested in order to resume development of a particular application.

Figure 21:
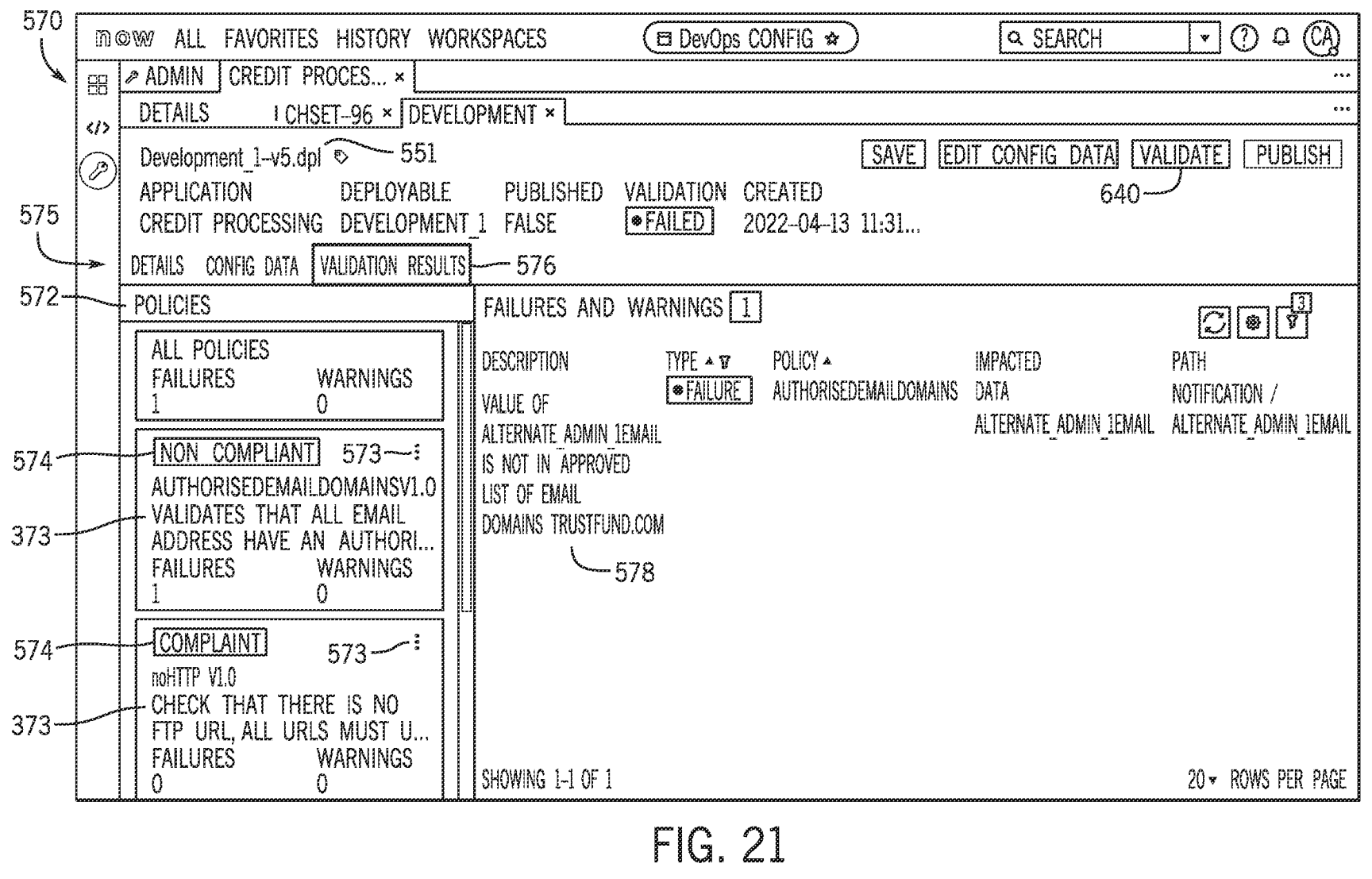

Turning to FIG. 21, upon selection of a change set 551 in the list 550, a screen 570 may be displayed. For example, upon selecting the "Development 1-v5" change set 551, the screen 570 may display information associated with the selected change set 551. In some embodiments, the screen 570 may include a policies section 572 which may display each of the PaCE policies 373 with embedded control objectives that have been mapped to a particular deployable 448. The policies section 572 may provide a brief overview of information indicative of which PaCE policies 373 have returned compliant or non-compliant upon validation of a change set 551. That is, because the change set 551 is also mapped to a particular deployable 448, each of the PaCE policies 373 mapped to a particular deployable 448 may be executed during the validation stage of a change set 551 to determine whether the change set 551 violates any of the controls embedded within the PaCE policies 373. In some embodiments, each of the PaCE policies 373 listed in the policy section 572 may include an options control 573, which upon selection, may enable a developer to request an exception to the PaCE policy 373, as described in greater detail below. Further, each of the PaCE policies 373 listed in the policy section 572 may also include a status indicator 574 that provides a status of each of the PaCE policies 373 (e.g., compliant, non-compliant, exception).

The screen 570 may also include a number of selectable pages 575 that provide additional information associated with the selected change set 551. In some embodiments, the selectable pages 575 may include a validation results page 576 that provides information related to whether a particular change set 551 passed validation (e.g., is complaint with the PaCE policies 373 employed by the organization) or failed validation (e.g., is non-compliant with one or more PaCE policies employed by the organization). As indicated in FIG. 20, the validation field 556 provided an indication that the "Development_1-v5" change set 551 failed validation. Accordingly, in FIG. 21, the validation results page 576 may provide information regarding why the change set 551 failed validation. That is, the validation results page 576 may include a description 578 that provides a reason as to why the change set 551 did not pass validation and/or an a type field 579 that provides information an indication as to whether the change set 551 failed validation, passed validation with an exception, or passed validation without an exception. Such information may be useful to a developer in determining whether to request an exception or rewrite the change set 551.

Figure 22:
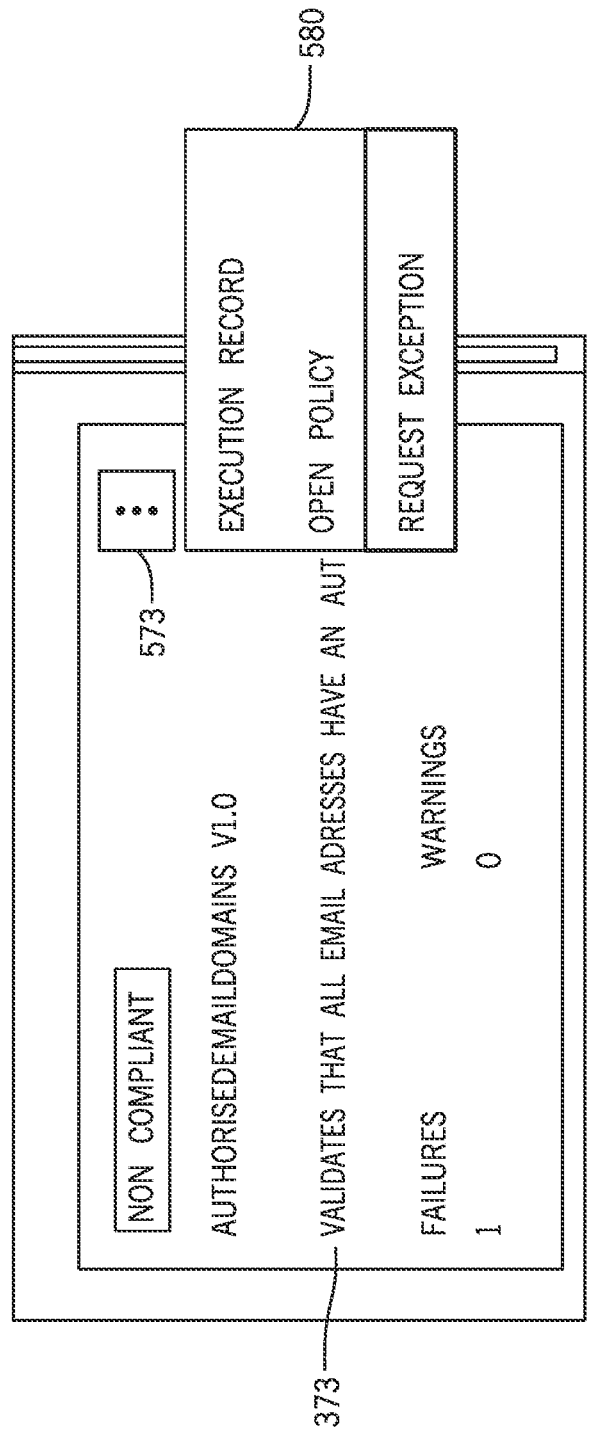
FIG. 22 depicts an example of a menu for requesting an exception to a policy as a code engine policy, in accordance with aspects of the present disclosure.

In the event that a developer cannot solve the underlying issue causing the change set 551 to return non-compliant with one or more of the PaCE policies 373 mapped to a specific deployable, the developer may request an exception to the PaCE policy, thereby enabling the developer to continue developing other aspects of the application 382. For example, as illustrated in FIG. 22, upon selection of the drop options control 573, a drop down menu 580 may be displayed which includes a "request an exception" option 581 that enables an exception to the associated PaCE policy 373 to be requested and submitted to a compliance manager. Upon selecting the "request an exception" option 581, a screen 590 (FIG. 23) may be displayed. As illustrated in FIG. 23, the screen 590 may include a deployable field 592 indicative of which application environment the PaCE policy 373 is associated with, a policy field 594 indicative of which PaCE policy 373 the developer is requesting the exception for, and a reason for exception field 596 configured to enable a developer to provide a reason for the requested exception. The screen 590 may also include a business justification field 598 configured to enable a developer to provide a business justification for needing the exception, a requested start date field 600 and a requested end date field 602 which may provide information related to a duration of the requested exception. For example, the developer may request a start date and an end date such that a time limit (e.g., 2 days, 1 week) for the exception is established. Further still, the screen 590 may include a request control 604 configured to enable a developer to submit a requested exception to a compliance manager. Indeed, after completing the various fields 596, 598, 600, 602, the developer may submit the request for review by a compliance manager, and upon granting the request, the developer may continue developing the application despite having portions of the application non-compliant with a particular PaCE policy 373.

Figure 24:
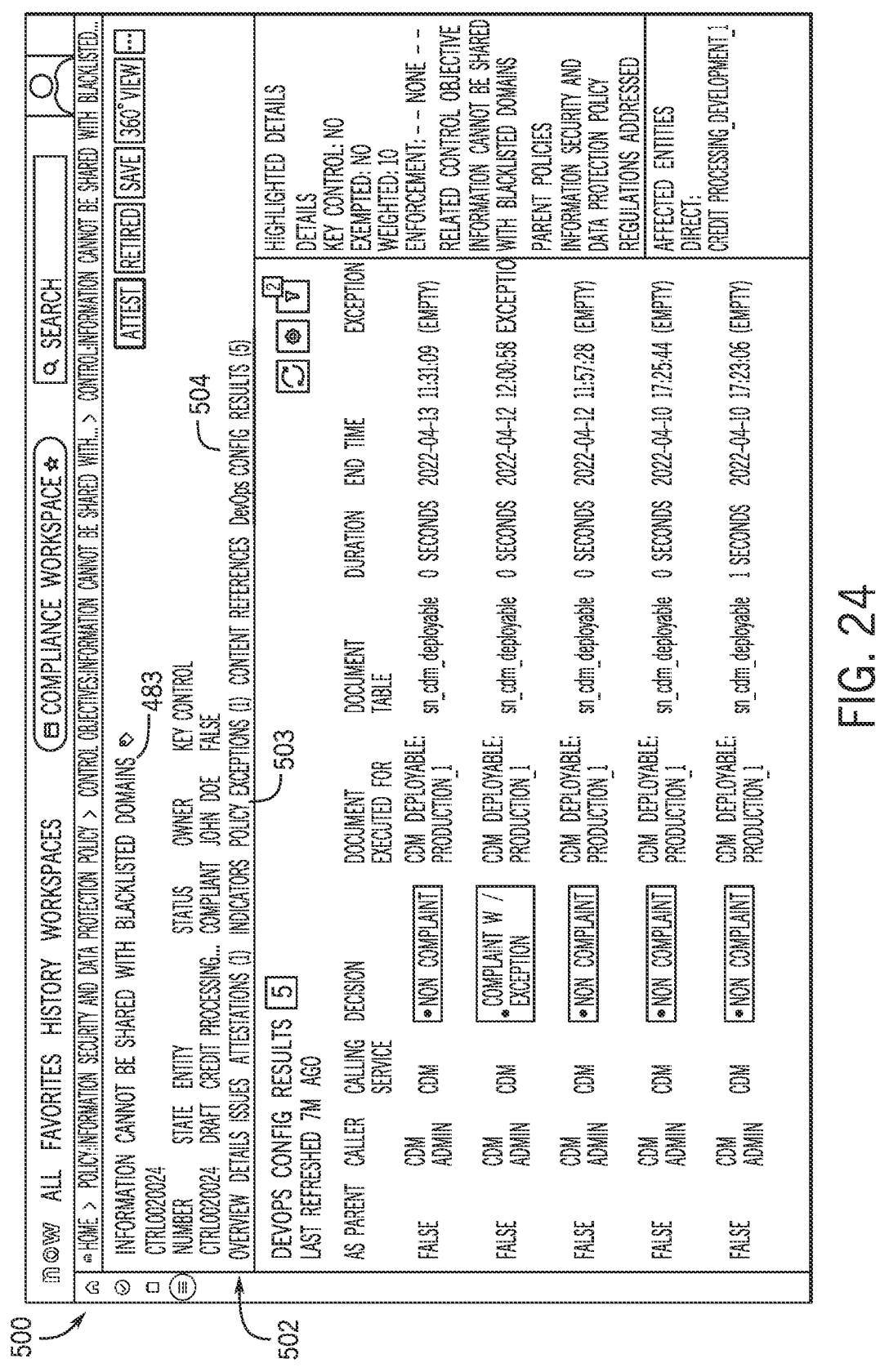
Figure 25:
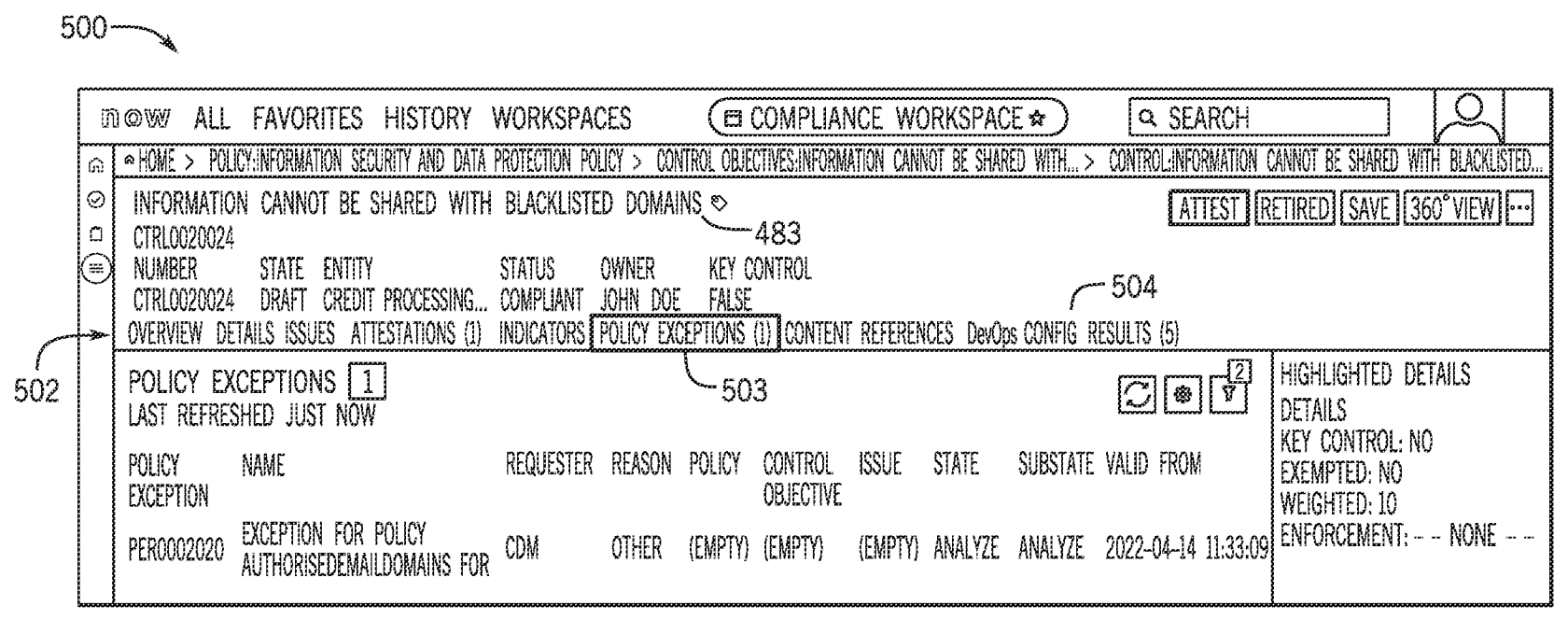

Upon submitting a request for an exception to a compliance manager, a notification may be sent to the compliance manager indicating that an exception has been requested. In turn, the compliance manager may evaluate the request utilizing the policy exceptions tab 503 of the screen 500 illustrated in FIG. 16. For example, as illustrated in FIG. 24, upon receiving a request for an exception from a developer, the policy exceptions tab 503 may be updated to reflect that a pending request for an exception is present. Upon selection of the policy exceptions tab 503, the screen 500 may display information associated with each of the requested exceptions for a particular control 483. That is, as illustrated in FIG. 25, upon selection of the policy exceptions tab 503, a requested exception 606 may be displayed and evaluated.

Figure 26A:
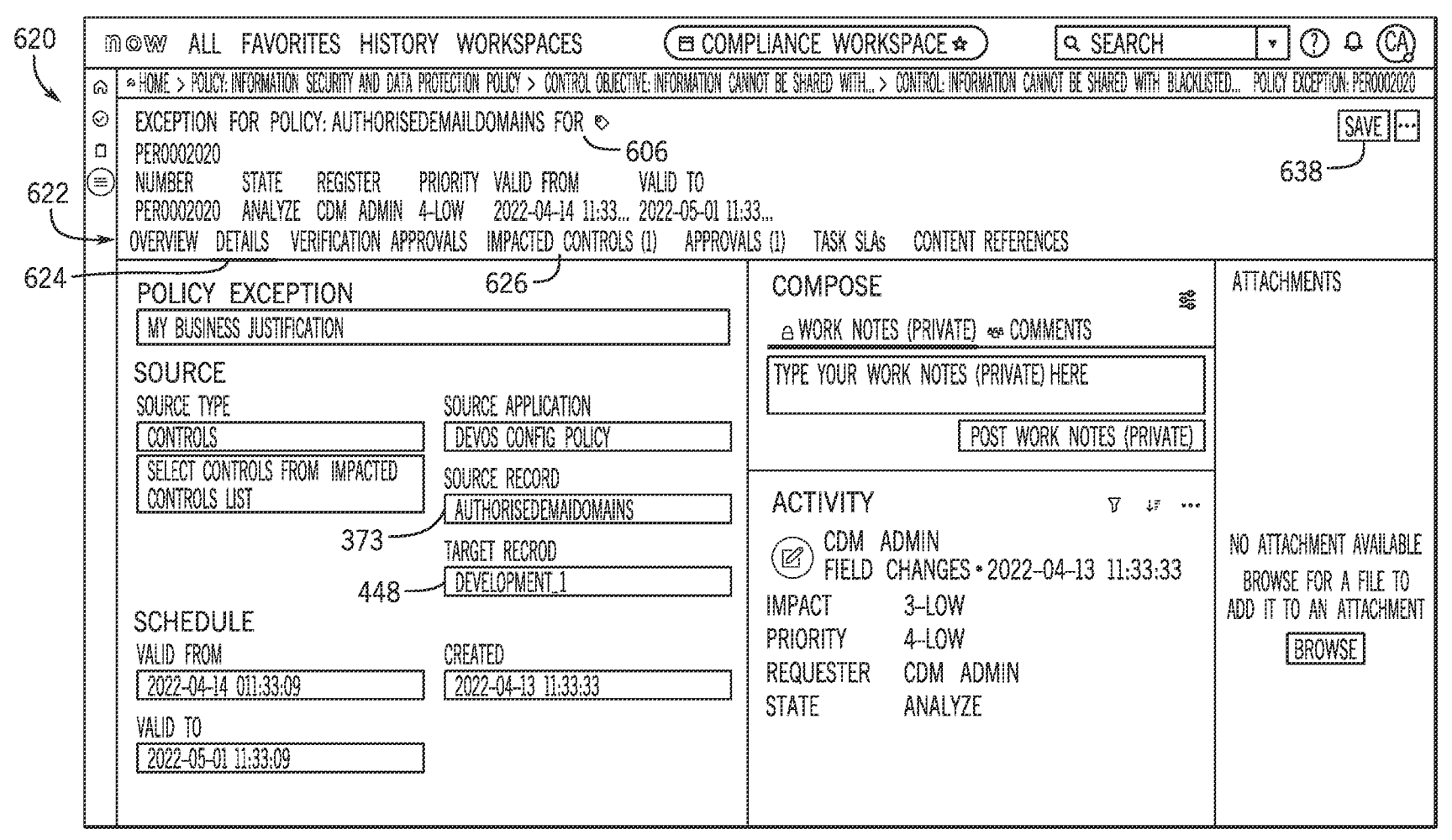

FIGS. 26A and 26B illustrate an embodiment of a screen 620 showing a view of the requested exception 606 submitted to the compliance manager. The screen 620 may include a number of pages 622 that may be selected to provide additional information associated with a requested exception 606. For example, the screen 620 may include a detail page 624 that includes the developer's reason for exception and/or the developer's business justification, which PaCE policy 373 the exception is requested for, which deployable 448 the exception is associated with, and the like, thereby enabling a compliance manager to evaluate a risk level associated with the exception. For example, exceptions requested for production deployable may be associated with an increased risk because production application environments may be utilized by customers of the organization. In contrast, exceptions requested for development and/or testing deployables may be associated with decreased risk levels because the associated applications are not provided to customers of the organization. The screen 620 may also include an impacted controls page 626 that may provide information related to which controls 483 are impacted by the requested exception (i.e., which controls are being violated).

In some embodiments, the screen 620 may also include a risk assessment section 630 on the detail page 624. The risk assessment section 630 may be completed by a compliance manager after the compliance manager has finished reviewing the request for an exception 606. The risk assessment section 630 may include a risk rating menu 632 that includes one or more options 634 available for selection depending on the compliance manager's evaluation of the risk associated with the requested exception. For example, as noted above, exceptions requested for production application environments may be associated with an increased risk rating (e.g., 4—critical) while exceptions requested for a test or development application environment may be associated with a decreased risk rating (e.g., 1—Low, 2—Medium). Additionally, the risk assessment section 630 may include a comments section 636 configured to enable a compliance manager to draft comments associated with the exception 606.

Upon evaluating and assessing the risk level associated with the requested exception, the compliance manager, utilizing a save control 638, may save the risk assessment and then may elect to approve or deny the requested exception via an approval control. In some embodiments, the exception request may be automatically approved or denied based on the risk assessment provided by the compliance manager. That is, in some embodiments, certain exception requests may be automatically denied based on an associated risk level exceeding a threshold value (e.g., risk rating greater than 2).

Figure 27:
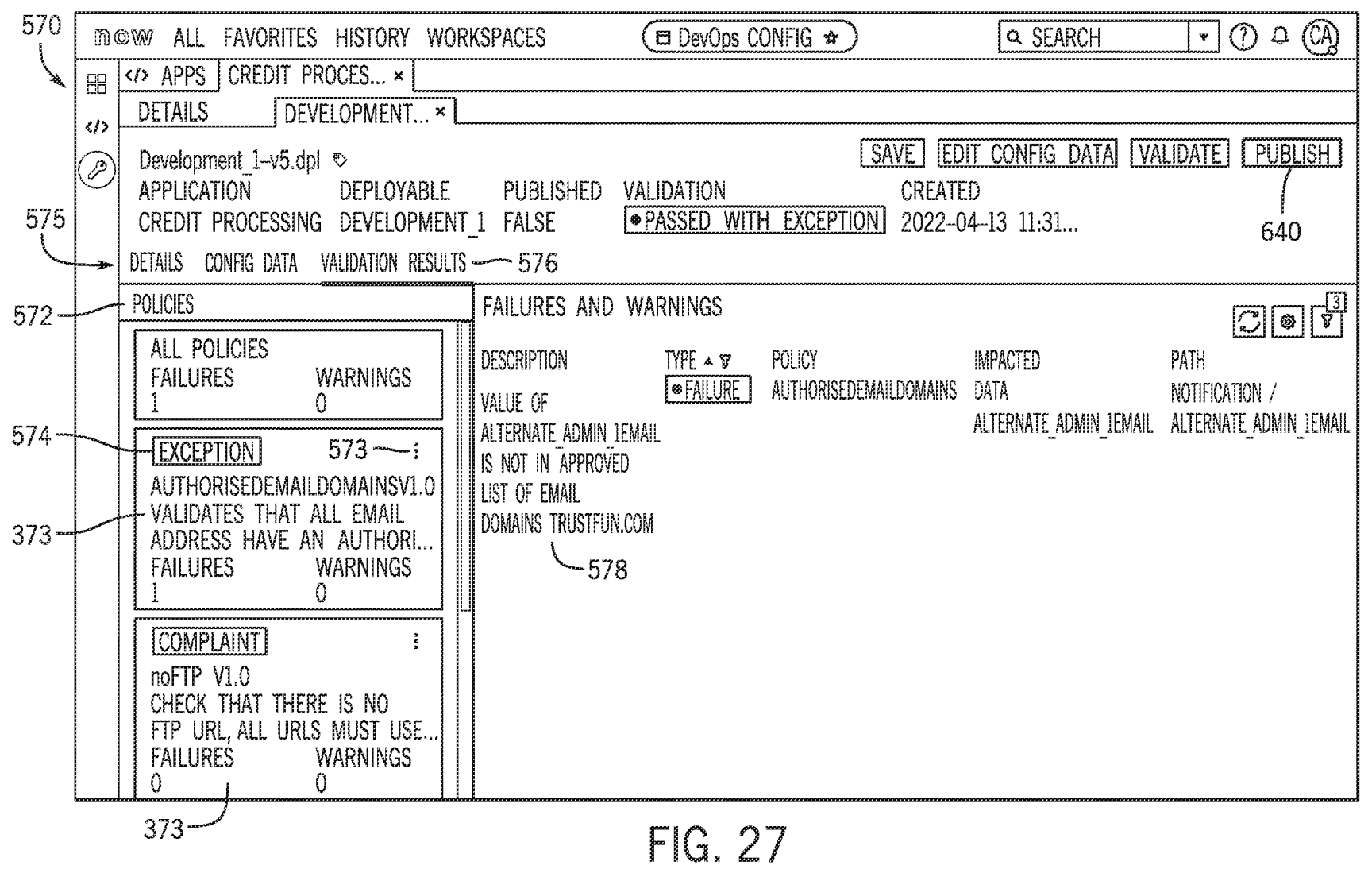

After receiving the indication that a requested exception has been approved, the developer may return to the screen 570 of FIG. 21 and revalidate the change set 551. For example, as illustrated in FIG. 27, the screen 570 displays the policy section 572 with each of the mapped PaCE policies 373 and an indication as to whether execution of the PaCE policies returned compliant or non-compliant. Upon selection of a validate control 640, the selected change set 551 may be reevaluated against the PaCE policies 373 that are mapped to the deployable 448 associated with the change set 551. However, because the compliance manager has approved the requested exception, the validation results may be different. For example, as indicated by the status indicator 574 associated with the "authorisedEmailDomains" PaCE policy 373, the status has changed from "Non-Compliant" to "Compliant with Exception," thus indicating that an exception has been requested and approved for a particular PaCE policy 373 associated with a particular deployable 448. In this way, developers may continue developing applications in a particular deployable 448 despite certain aspects of the source code of the application being non-compliant with one or more controls embedded in the PaCE policies 373 mapped to that particular deployable 448. As noted above, in some embodiments, a time limit (e.g., active window for the exception) may be established based on the requested start date and end date such that upon exceeding the time limit for a particular exception, the developer may be restricted from continued development of the application. Further, while a request for an exception may be granted, the requested start date may indicate the request for the exception is for a time in the future. Accordingly, upon revalidating the change set, if the requested start date for the exception is for a time in the future, the validation results may still return non-compliant until the requested start date has been reached.

Figure 28:
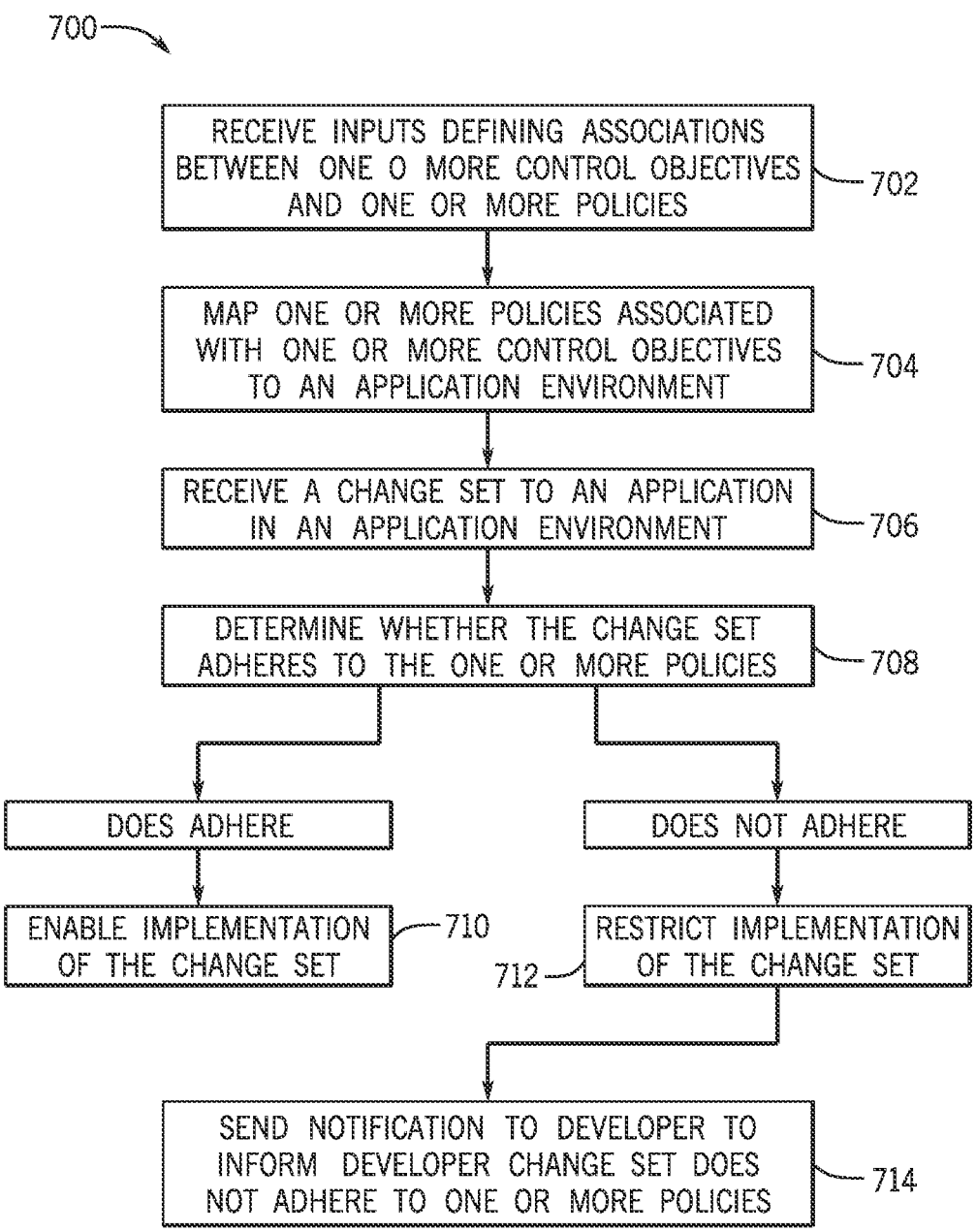
FIG. 28 depicts a flow chart of a method for evaluating a compliance status of a change set applied to an application, in accordance with aspects of the present disclosure.

FIG. 28 illustrates a flow chart of a method 700 for associating control objectives with regulatory policies employed by an organization and evaluating a compliance status of an application based on the regulatory policies. Although the following description of the method 700 is described in a particular order, it should be noted that the method 700 is not limited to the depicted order; and instead, the method 700 may be performed in any suitable order. In addition, it should be understood that the method 700 may be performed by one or more suitable computing devices having at least one processor capable of performing the functions described herein.

Referring now to FIG. 28, at block 702, a representative of the organization (e.g., compliance manager, enterprise architect) may provide one or more inputs that define associations between one or more control objectives and one or more codified policies employed by the organization. That is, as noted above, a policy as a code engine may be utilized to generate a repository of codified policies. In turn, a processor may receive inputs from a computing device associated with the representative that associate one or more control objectives with the codified policies, thereby providing business and regulatory context to the codified policies.

After receiving inputs associating the one or more codified policies with one or more control objectives, at block 704, the one or more policies associated with the one or more control objectives may be mapped to an application environment. As noted above, applications may be deployed in different environments including a development application environment, a test application environment, and/or a production application environment. Further, it should be noted that the mapped policies associated with the one or more control objectives may be stored in a database which may be accessed to determine whether a change set applied by a developer adheres to the one or policies associated with the one or more control objectives stored in the database.

For example, upon mapping the codified policies to a particular application environment, at block 706, the processor may receive a change set to an application in an application environment. In some embodiments, the change set may comprise source code written by a software developer that corresponds to one or more modifications applied to an existing application. In other embodiments, the change set may comprise written source code that corresponds to a new application being developed by a software developer. It should be noted that in some embodiments, the change set may be sent from a client device that is different from the client device used in block 702 to associate control objectives with the one or more policies.

At block 708, the processor may determine whether the change set adheres to the one or more policies applied to the application environment in which the change set is to be deployed. As noted above, in some embodiments, the processor may access a database storing a plurality of associations between the one or more policies and the one or more control objectives to determine whether the change set adheres to the one or more policies associated with the one or more control objectives.

If the change set does adhere to the one or more policies mapped to the application environment, the method 700 may proceed to block 710, and the processor may enable implementation of the change set to the application in the application environment.

If the change set does not adhere to the one or more policies mapped to the application environment, the method 700 may proceed to block 712, and the processor may restrict implementation of the change set to the application in the application environment.

Further, in some embodiments, upon determining that the change set does not adhere to the one more policies, the processor, at block 714, may send a notification to a computing device associated with the software developer to notify the developer that the change set is not compliant with at least one of the one or more policies employed by the organization. In some embodiments, the notification may include a recommendation to the developer to request an exception to the one or more policies, thereby enabling the developer to continue developing the application.

Figure 29:
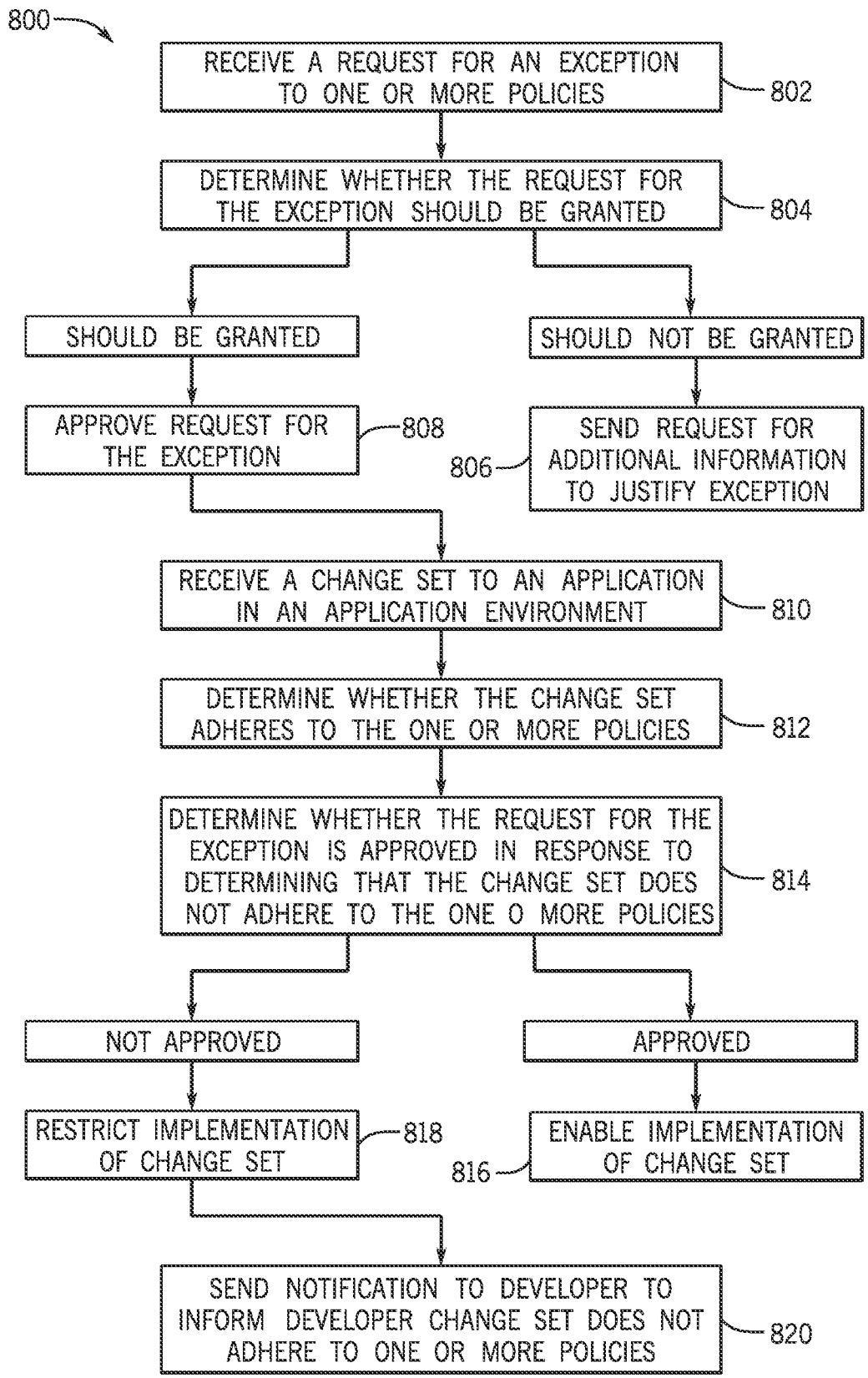
FIG. 29 depicts a flow chart of a method for requesting and approving an exception to a policy employed by an organization, in accordance with aspects of the present disclosure.

FIG. 29 illustrates a flow chart of a method 800 for requesting exceptions to one or more policies employed by an organization. Although the following description of the method 800 is described in a particular order, it should be noted that the method 800 is not limited to the depicted order; and instead, the method 800 may be performed in any suitable order. In addition, it should be understood that the method 800 may be performed by one or more suitable computing devices having at least one processor capable of performing the functions described herein.

Referring now to FIG. 29, at block 802, the processor may receive a request for an exception to one or more policies from a client device associated with a software developer. The request for the exception may include contextual information that may enable a compliance manager to determine whether the request for the exception should be granted. For example, the request for the exception may include a reason for the request, a business justification for the request, a requested start date for the exception, and/or a requested end date for the exception.

At block 804, a compliance manager responsible for approving requests for exceptions may determine whether to grant the request for the exception based on the contextual information provided by the software developer in the request. For example, the compliance manager may assess a risk level associated with the request based on an application environment in which the exception will be applied and/or a duration of the exception. Further, the compliance manager may review the reasons for the request and the business justification for the request to determine the risk level. In some embodiments, the compliance manager may compare a risk level to a threshold value to determine whether to grant a request for an exception.

If the compliance manager determines that the request for the exception should not be granted (e.g., risk level exceeds the threshold value), the method 800 may proceed to block 806, and the compliance manager may request additional information from the software developer to justify approving the request for the exception.

If the compliance manager determines that the request for the exception should be granted (e.g., risk level is below the threshold value), the method 800 may proceed to block 808, and the request for the exception may be approved.

At block 810, the processor may receive, from the client device associated with a software developer, a change set to an application in an application environment. As noted above, the change set may comprise source code written by a software developer that corresponds to one or more modifications applied to an existing application. In other embodiments, the change set may comprise written source code that corresponds to a new application being developed by a software developer.

Similar to block 708 of FIG. 28, at block 812, the processor may determine whether the change set adheres to the one or more policies mapped to the application environment in which the change set is to be applied.

If the change set does adhere to the one or more policies, the change set may be implemented in the application environment. However, if the change set does not adhere to the one or more policies, at block 814, the processor may determine whether an exception has been requested and/or approved.

If a request for an exception has been received and approved, the method 800 may proceed to block 816, and the processor may enable implementation of the change set in the application environment.

If a request for an exception has not been received and approved, the method 800 may proceed to block 818, and the processor may restrict implementation of the change set to the application environment.

Further, similar to block 714 of FIG. 28, at block 820, upon determining that the change set does not adhere to the one more policies and that no requests for exceptions have been received and approved, the processor may send a notification to a computing device associated with the software developer to notify the developer that the change set is not compliant with at least one of the one or more policies employed by the organization. In some embodiments, the notification may include a recommendation to the developer to request an exception to the one or more policies, thereby enabling the developer to continue developing the application.

The present techniques discussed herein are directed towards leveraging the capabilities of a policy as a code engine (PaCE) to generate codified policies which may then be associated with control objectives to provide business and regulatory context to the codified policies. In turn, the codified policies may be associated with (e.g., mapped to) various application environments and executed against the written source code of the applications in the application environments to determine whether the source code complies with the control objectives embedded in the codified policies. In this way, technology risks may be limited during development and/or deployment of the application. Further, developers responsible for writing the source code for applications may request exceptions to certain codified policies, thereby enabling the developer to continue developing an application despite aspects of the application being non-compliant with the codified policies. Further still, compliance logs may be generated that provide evidence of a compliance status of an organization, thereby facilitating a compliance review process.

Indeed, the techniques discussed herein provide a technical benefit over traditional application development and deployment procedures by associating control objectives with policies employed by the organization, thereby providing business and regulatory context to the policies employed by the organization. The policies (with embedded controls) may then be executed against written source code for one or more applications to determine whether the application adheres to the policies employed by the organization. That is, preventative controls may be implemented such that non-compliant aspects of an application may be addressed prior to deploying the application to customers of the organization. Such techniques provide an improvement over traditional systems by reducing the amount of training needed by a developer to become familiar with policies employed by the organization.

Further, the techniques discussed herein provide a technical benefit of generating compliance logs that provide visibility into a compliance status of an application. In this way, an improvement over traditional application development and deployment processes is achieved as individuals responsible for managing and/or reviewing the compliance status of an application may refer to the generated compliance logs, thereby increasing efficiency of a compliance review process and limiting a potential for human error by obviating the need for a manual review process. Further still, the techniques discussed herein provide an additional benefit over traditional application development and deployment procedures by enabling exceptions to be granted for particular policies. In this way, developers may continue developing an application despite aspects of the application being non-compliant with one or more policies employed by the organization, thereby increasing an efficiency of the application development and deployment process.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    a processor; and
    a memory storing instructions thereon that, when executed, cause the processor to perform operations comprising:
        receiving, from a client device, inputs defining associations between one or more control objectives and one or more policies, wherein the one or more control objectives define one or more functions to be performed to comply with the one or more policies;
        mapping the one or more policies associated with the one or more control objectives to an application development environment;
        receiving, from the client device or a different client device, a change set to an application in the application development environment, wherein the change set comprises one or more modifications to a portion of source code associated with the application in the application development environment;
        determining whether the change set adheres to the one or more policies;
        suspending development of the application in the application development environment such that implementation of the change set is restricted in response to determining that the change set does not adhere to the one or more policies;
        receiving, from the client device or the different client device, a request for an exception to at least one of the one or more policies in response to determining that the change set does not adhere to the one or more policies;
        enabling the implementation of the change set in the application development environment in response to the request for the exception being approved; and
        resuming the development of the application in the application development environment in response to the request for the exception being approved.

2. The system of claim 1, the operations comprising:
    enabling the implementation of the change set to the application in the application development environment in response to determining that the change set does adhere to the one or more policies.

3. The system of claim 1, wherein the one or more policies are codified by a policy as a code engine that comprises a repository of policies.

4. The system of claim 1, the operations comprising:
    displaying the one or more control objectives via a graphical user interface associated with the client device.

5. The system of claim 1, the operations comprising:
    transmitting a notification to the client device or the different client device in response to determining that the change set does not adhere to the one or more policies, wherein the notification includes a recommendation to request the exception to enable the implementation of the change set.

6. The system of claim 1, the operations comprising:
    generating one or more graphical representations configured to be displayed on a graphical user interface in response to determining whether the change set adheres to the one or more policies, wherein the one or more graphical representations provide information on a compliance status of the application in the application development environment.

7. The system of claim 1, the operations comprising receiving an indication to approve the request for the exception based on one or more inputs received from another client device.

8. The system of claim 7, the operations comprising assessing a risk level associated with the request for the exception based on the one or more inputs, wherein the request for the exception is approved based on the risk level being below a threshold value.

9. A method for testing compliance in an application development environment, comprising:
    receiving, from a client device, a change set to an application in the application development environment, wherein the change set comprises one or more modifications to a source code of the application;
    accessing a database storing a plurality of associations between one or more control objectives and one or more policies, wherein the one or more control objectives define functions to be performed to comply with the one or more policies;
    determining whether the change set complies with the one or more policies associated with the one or more control objectives stored in the database;
    suspending development of the application in the application development environment such that implementation of the change set is restricted in response to determining that the change set does not comply with the one or more policies;
    receiving, from the client device, a request for an exception to at least one of the one or more policies in response to determining that the change set does not comply with the one or more policies;
    enabling the implementation of the change set in the application development environment in response to the request for the exception being approved; and resuming the development of the application in the application development environment in response to the request for the exception being approved.

10. The method of claim 9, comprising:
enabling the implementation of the change set in the application development environment in response to determining that the change set does comply with the one or more policies.

11. The method of claim 9, comprising:
transmitting a notification to the client device in response to determining that the change set does not comply with the one or more policies, wherein the notification includes a recommendation to request the exception to enable the implementation of the change set.

12. The method of claim 9, comprising:
receiving an indication to approve the request for the exception based on one or more inputs received from another client device.

13. The method of claim 12, comprising:
assessing a risk level associated with the request for the exception based on the one or more inputs, wherein the request for the exception is approved based on the risk level being below a threshold value.

14. The method of claim 9, comprising generating one or more graphical representations configured to be displayed on a graphical user interface in response to determining whether the change set complies with the one or more policies, wherein the one or more graphical representations provide information on a compliance status of the application in the application development environment.

15. The method of claim 9, comprising codifying the one or more policies via a policy as a code engine that comprises a repository of policies.

16. The method of claim 9, comprising displaying the one or more control objectives via a graphical user interface associated with the client device.

17. A non-transitory, computer-readable medium comprising computer-executable instructions configured to, when executed, cause a processor to:
receive, from a client device, a request for an exception to one or more policies associated with one or more control objectives, wherein the one or more policies associated with the one or more control objectives are mapped to one or more application environments, and wherein the one or more control objectives define one or more functions to be performed to comply with the one or more policies;
receive, from the client device, a change set to an application in an application development environment of the one or more application environments, wherein the change set comprises one or more modifications to a portion of source code associated with the application;
determine whether the change set adheres to the one or more policies associated with the one or more control objectives;
suspend development of the application in the application development environment such that implementation of the change set is restricted in response to determining that the change set does not adhere to the one or more policies;
determine whether the request for the exception is granted in response to determining that the change set does not adhere to the one or more policies;
enable the implementation of the change set in response to determining that the request for the exception is granted; and
resume the development of the application in the application development environment in response to determining that the request for the exception is granted.

18. The non-transitory, computer-readable medium of claim 17, wherein the instructions cause the processor to receive an indication to grant the request for the exception based on one or more inputs from another client device.

19. The non-transitory, computer-readable medium of claim 17, wherein the one or more policies are generated by a policy as a code engine that comprises a repository of policies.

20. The non-transitory, computer-readable medium of claim 17, wherein the instructions cause the processor to generate one or more graphical representations configured to be displayed on a graphical user interface in response to receiving the change set to the application, wherein the one or more graphical representations provide information on a compliance status of the application in the application development environment.

* * * * *